(12) United States Patent
Kiani et al.

(10) Patent No.: US 10,763,698 B2
(45) Date of Patent: Sep. 1, 2020

(54) SELF-REGULATED RECONFIGURABLE RESONANT VOLTAGE/CURRENT-MODE METHOD AND DEVICE FOR EXTENDED-RANGE INDUCTIVE POWER TRANSMISSION

(71) Applicant: The Penn State Research Foundation, University Park, PA (US)

(72) Inventors: Mehdi Kiani, State College, PA (US); Hesam Sadeghi Gougheri, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 323 days.

(21) Appl. No.: 15/680,018

(22) Filed: Aug. 17, 2017

(65) Prior Publication Data

US 2018/0062447 A1 Mar. 1, 2018

Related U.S. Application Data

(60) Provisional application No. 62/378,364, filed on Aug. 23, 2016, provisional application No. 62/533,832, filed on Jul. 18, 2017.

(51) Int. Cl.
*H02J 50/12* (2016.01)
*H02J 7/02* (2016.01)
*G06K 7/00* (2006.01)

(52) U.S. Cl.
CPC .............. *H02J 50/12* (2016.02); *H02J 7/025* (2013.01); *G06K 7/0008* (2013.01)

(58) Field of Classification Search
CPC .................................. H02J 50/10; H02J 50/12
USPC ........................................................ 307/104
See application file for complete search history.

(56) References Cited

U.S. PATENT DOCUMENTS

| 8,097,983 | B2 | 1/2012 | Karalis et al. | |
|---|---|---|---|---|
| 8,884,468 | B2 * | 11/2014 | Lemmens | H02J 5/005 307/104 |
| 8,947,047 | B2 | 2/2015 | Partovi et al. | |
| 9,172,436 | B2 | 10/2015 | Miyauchi et al. | |
| 9,184,632 | B2 * | 11/2015 | Kirby | H02J 5/005 |

(Continued)

OTHER PUBLICATIONS

Cheng, L. et al., A 6.78MHz 6W wireless power receiver with a 3-level 1 × /½ × / 0× reconfigurable resonant regulating rectifier, *IEEE Int. Solid State Cir. Conf. (ISSCC) Dig. Tech. Papers*, pp. 376-377, Feb. 2016.

(Continued)

*Primary Examiner* — Rexford N Barnie
*Assistant Examiner* — Joseph N Inge
(74) *Attorney, Agent, or Firm* — Dinsmore & Shohl LLP

(57) ABSTRACT

A current-based resonant power delivery (CRPD) device and method with multi-cycle switching that enables efficient inductive power transmission at large distances. The proposed CRPD switches the Rx LC-tank for several cycles to utilize it as a current source. Therefore, the voltage across the load ($R_L$) can be significantly higher than the Rx LC-tank voltage. In CRPD, the energy may first be stored in the receiver (Rx) coil by shorting the Rx LC-tank for several power carrier cycles. At the peak of Rx coil current, the coil energy may then be transferred to load ($R_L$) for a quarter of the power carrier cycle.

9 Claims, 19 Drawing Sheets

(56) References Cited

U.S. PATENT DOCUMENTS

| | | | |
|---|---|---|---|
| 2002/0180668 A1* | 12/2002 | Ide | G09G 3/294 345/60 |
| 2009/0096413 A1* | 4/2009 | Partovi | H01F 38/14 320/108 |
| 2011/0133569 A1 | 6/2011 | Cheon et al. | |
| 2012/0112543 A1* | 5/2012 | van Wageningen | H02J 50/90 307/43 |
| 2012/0127765 A1* | 5/2012 | Maruyama | H02J 5/005 363/126 |
| 2012/0170337 A1* | 7/2012 | Lisi | H02J 50/12 363/126 |
| 2013/0099591 A1* | 4/2013 | Yeo | H02M 7/217 307/104 |
| 2013/0249479 A1* | 9/2013 | Partovi | H04B 5/0087 320/108 |
| 2013/0257167 A1* | 10/2013 | Singh | H02J 50/12 307/104 |
| 2014/0028111 A1 | 1/2014 | Hansen et al. | |
| 2014/0140420 A1* | 5/2014 | Ghovanloo | H04W 52/0209 375/259 |
| 2014/0273835 A1* | 9/2014 | Ghovanloo | H04B 5/0075 455/41.1 |
| 2015/0214788 A1* | 7/2015 | Hosotani | H02J 7/025 307/104 |
| 2015/0280455 A1* | 10/2015 | Bosshard | B60L 53/126 307/104 |
| 2015/0295418 A1* | 10/2015 | Ren | H02J 7/025 307/104 |
| 2016/0336811 A1* | 11/2016 | Liu | H02M 7/219 |
| 2017/0033612 A1* | 2/2017 | Su | H02H 9/04 |

OTHER PUBLICATIONS

Choi, M. et al., A current-mode wireless power receiver with optimal resonant cycle tracking for implantable systems, *IEEE Int. Solid State Cir. Conf. (ISSCC) Dig. Tech. Papers*, pp. 372-373, Feb. 2016.

Kiani, M. et al., A Q-modulation technique for efficient inductive power transmission, *IEEE J. Solid State Cir.*, vol. 50, pp. 2839-2848, 2015.

Kim, C. et al., A fully integrated 144 MHz wireless-power-receiver-on-chip with an adaptive buck-boost regulating rectifier and low-loss H-Tree signal distribution, in *Proc. Symp. VLSI Circuits*, Jun. 2015, pp. C284-C285.

Lee, E., A voltage doubling passive rectifier/regulator circuit for biomedical implants, *IEEE Custom Integrated Cir. Con.(CICC)*, pp. 1-4, Sep. 2015.

Lee, H. et al., An adaptive reconfigurable active voltage doubler/rectifier for extended-range inductive power transmission, *IEEE Int. Solid State Cir. Conf. (ISSCC) Dig. Tech. Papers*, pp. 286-288, Feb. 2012.

* cited by examiner

SELF-REGULATED RECONFIGURABLE RESONANT VOLTAGE/CURRENT-MODE METHOD AND DEVICE FOR EXTENDED-RANGE INDUCTIVE POWER TRANSMISSION

REFERENCE TO RELATED APPLICATIONS

This application claims priority from U.S. Provisional Patent Application Ser. Nos. 62/378,364, filed Aug. 23, 2016 and 62/533,832, filed Jul. 18, 2017, the entire content of both of which is incorporated herein by reference.

FIELD OF THE INVENTION

The present invention relates to circuitry for use in inductive power transfer systems and, in particular, to a self-regulated reconfigurable resonant voltage/current mode device and method for extended-range inductive power transmission.

BACKGROUND OF THE INVENTION

Inductive power transmission has been used extensively over the past decades for contactless energy transfer to power a device or recharge its battery. It has covered a wide range of applications with different power requirements from μW to kW. Some examples include powering radio frequency identification (RFID) tags and implantable medical devices (IMDs), and recharging batteries of handheld mobile devices and electric vehicles. FIG. 1 shows a generic model of a conventional inductive power transmission link. It includes a rectifier or a voltage multiplier depending on the voltage amplitude across $L_2C_2$-tank, i.e., $V_R$. The power management also includes a regulator (not shown). In an inductive power transmission link, as shown in FIG. 1, an efficient power amplifier (PA) drives the transmitter (Tx) coil, which is mutually coupled to a receiver (Rx) coil. A power management is required to rectify and regulate the AC voltage across the $L_2C_2$-tank ($V_R$) to a constant DC voltage across the load ($R_L$), i.e., $V_L$ in FIG. 1.

In general, there are four key parameters in inductive power transmission: (1) power delivered to the load (PDL), defined as $P_L = V_L^2/R_L$; (2) power transmission efficiency (PTE), defined as $P_L/P_S$, where $P_S$ is the PA output power; (3) power conversion efficiency (PCE) within Rx, defined as $P_L/P_R$, where $P_R$ is the power management input power; and (4) voltage conversion efficiency (VCE) in Rx, defined as $V_L/V_{R,peak}$, where $V_{R,peak}$ is the amplitude of $V_R$.

While achieving high PTE and sufficient PDL should always be considered in the design of inductive links, maximizing PCE or VCE depends on $V_R$. When $V_R$ is larger than the required $V_L$, which is the case when coupling distance (d) is relatively small and coils are well aligned, high PCE is more desirable to maximize the power efficiency within Rx, and VCE<1 V/V is quite acceptable. However, for $V_R < V_L$ with large d and/or misaligned coils, VCE>1 V/V is paramount to achieve the required $V_L$ even at the cost of lower PCE. Therefore, for most wireless power transmission (WPT) applications that involve d and coil orientation (ϕ) variations, the power management should be able to sense $V_R$ and decide to whether maximize PCE or VCE.

The mutual coupling between a pair of coupled coils, $k_{12}$, is inversely proportional to $d^3$. A key requirement in all of the aforementioned applications is to provide sufficient $V_L$, while maintaining high PTE. In worst-case conditions when d is relatively large, then the coils are misaligned, or the Rx coil is miniaturized. It should also be noted that even in some low-power applications such as neural stimulators, a relatively high $V_L$ is often required. In these conditions, one can increase the PA voltage, $V_S$, to further increase $V_L$. In practice, however, $V_L$ can only be increased to the extent that the tissue exposure to the electromagnetic field is maintained within safety limits, and regulatory requirements for interference with nearby electronics are satisfied. Therefore, achieving sufficient $V_L$ at large distances is quite challenging.

The PTE of the 2-coil link in FIG. 1 is also highly sensitive to $R_L$, which is often given by the application. In order to improve PTE for any $R_L$, multi-coil links in the form of 3- and 4-coil links have been proposed that provide load matching inside Rx. However, these links need an additional coil in the Rx, which adds to the size, cost, and complexity of the system. In some applications, $R_L$ can change significantly during the operation while 3- and 4-coil links cannot dynamically compensate for $R_L$ variations during the system operation. Alternatively, off-chip matching circuits can also be used to transform $R_L$. However, a network of off-chip capacitors and inductors is needed to dynamically tune a wide range of $R_L$ during the operation, which again adds to the size, cost, and power loss in the Rx. Therefore, the power management should also provide optimal load condition during the operation.

In order to improve the PCE within Rx, active rectifiers with high-speed synchronous comparators, some equipped with delay compensation, have been presented in recent years. A 3-level reconfigurable resonant regulating rectifier simultaneously rectifies and regulates $V_L$ by switching between full-bridge, half-bridge, and no rectifier structures. A resonant regulation rectifier may employ pulse-width/frequency modulation to adjust the on-time window of the active rectifier switch for self-regulating $V_L$, by controlling the forward current. Although high PCE and self-regulation have been achieved in active rectifiers, they suffer from low VCE<1 V/V due to the voltage drop across the active switch.

In order to improve VCE, voltage doublers, multipliers, and DC-DC converters have been presented in the past. The power-management structure may also be switched between rectifier and doubler for voltage regulation and range extension. Although these techniques can improve VCE, they require additional AC-DC converters and/or off-chip components due to the low-frequency operation of the inductive links (<20 MHz), adding to the size, cost, and power loss in the Rx. A common theme with the aforementioned power managements is that they use the Rx LC-tank as a voltage source, i.e., they operate in voltage mode (VM), inherently leading to limited VCE.

SUMMARY OF THE INVENTION

A current-based resonant power delivery device for inductive power transmission to a load is disclosed herein. In accordance with one embodiment, the device comprise a transmitter coil, a receiver circuit, the receiver circuit having a receiver coil, a resonance capacitor, a switch, a rectification device, and a load capacitor. The transmitter coil is configured to energize the receiver coil. The receiver coil is connected to the load via the resonance capacitor and the rectification device. The switch has a first state and a second state. The receiver circuit is configured to build up and transfer energy between the receiver coil and the resonance capacitor by bypassing the load during the first state of the switch. The receiver circuit is further configured to transfer energy from the receiver coil to the load during the second state of the switch. The rectification device may include a diode.

In some embodiments, the switch remains in the first state for a plurality of power carrier cycles until the receiver coil reaches a desired receiver coil current and then the switch transitions from the first state to the second state, the switch remains in the second state for one-quarter of a power cycle, and returns to the first state for the plurality of power carrier cycles. The switch may have an adjustable switch frequency, and the switch transitions from the first state to the second state and vice versa. In some embodiments, the receiver coil and the resonance capacitor are connected in a series connection, the switch is connected in parallel with the series connection, and the rectification device is connected between the resonance capacitor and the load. In some embodiments, the switch is transitioning between the first state and the second state at a switching frequency to maintain the load about a desired voltage.

A current-based resonant power delivery method for inductive power transmission to a load is also disclosed herein. The method comprise the steps of providing the above-discussed current-based resonant power delivery device, energizing the transmitter coil, selecting the first state of the switch for building up and transferring energy between the receiver coil and the resonance capacitor for a predetermined time and selecting the second state of the switch for transferring energy from the receiver coil to the load after the pre-determined time. Some embodiments in accordance with the method may comprise the steps of connecting the receiver coil and the resonance capacitor to each other in a series connection, connecting the switch in parallel with the series connection, and connecting the rectification device between the capacitor and the load.

A self-regulated resonant voltage/current mode method power delivery device for inductive power transmission to a load is also disclosed herein. In accordance with one embodiment, the device comprise a transmitter coil, a receiver circuit, the receiver circuit has a receiver coil, a resonance capacitor, a first switch, a second switch, a rectification device, and a load capacitor, wherein the transmitter coil is configured to energize the receiver coil. The embodiment also comprise a mode selection circuit operable to select a voltage mode or a current mode based on a voltage across the receiver coil and a desired load voltage across the load, the mode selection circuit selects the voltage mode when the desired load voltage is less than the receiver coil voltage and the mode selection circuit selects the current mode when the desired load voltage is more than the receiver coil voltage.

Furthermore, the receiver coil is connected to the load via the first switch, the first switch is configured to maintain the load about the desired load voltage by employing back current during the voltage mode, the receiver coil is further connected to the load via the resonance capacitor and the rectification diode, wherein the second switch is connected from the resonance capacitor to the ground. The second switch in accordance with the embodiment has a first state and a second state, the receiver circuit is configured to build up and transfer energy between the receiver coil and the resonance capacitor by bypassing the load during the first state of the second switch during the current mode, the receiver circuit is further configured to transfer energy from the receiver coil to the load during the second state of the second switch when a desired energy is stored in the receiver coil during the current mode, and the second switch is configured to maintain the load about the desired load voltage by adjusting its switching frequency during the current mode.

In some embodiments of the self-regulated device, the first switch transitions between an ON state and an OFF state at a first switching frequency. The first switch may employ back current during the ON state. In some self-regulated devices, the second switch transitions between the first state and the second state at a second switching frequency. The receiver coil and the resonance capacitor may be connected in a series connection, the second switch connected in parallel with the series connection, and the rectification device connected between the resonance capacitor and the load. The rectification device may comprise a third switch and the receiver circuit configured to transfer energy from the receiver coil to the load through the third switch during the second state of the second switch. Some embodiments further comprise a voltage mode controller, and the voltage mode controller regulates the first switching frequency to maintain the load about the desired load voltage. Other embodiments further comprise a current mode controller, and the current mode controller regulates the second switching frequency to maintain the load about the desired load voltage.

BRIEF DESCRIPTION OF THE DRAWINGS

The accompanying drawings, which are included to provide a further understanding of the invention and are incorporated in and constitute a part of this application, illustrate embodiment (s) of the invention and together with the description serve to explain the principle of the invention. In the drawings.

DETAILED DESCRIPTION OF THE INVENTION

Figure 1:
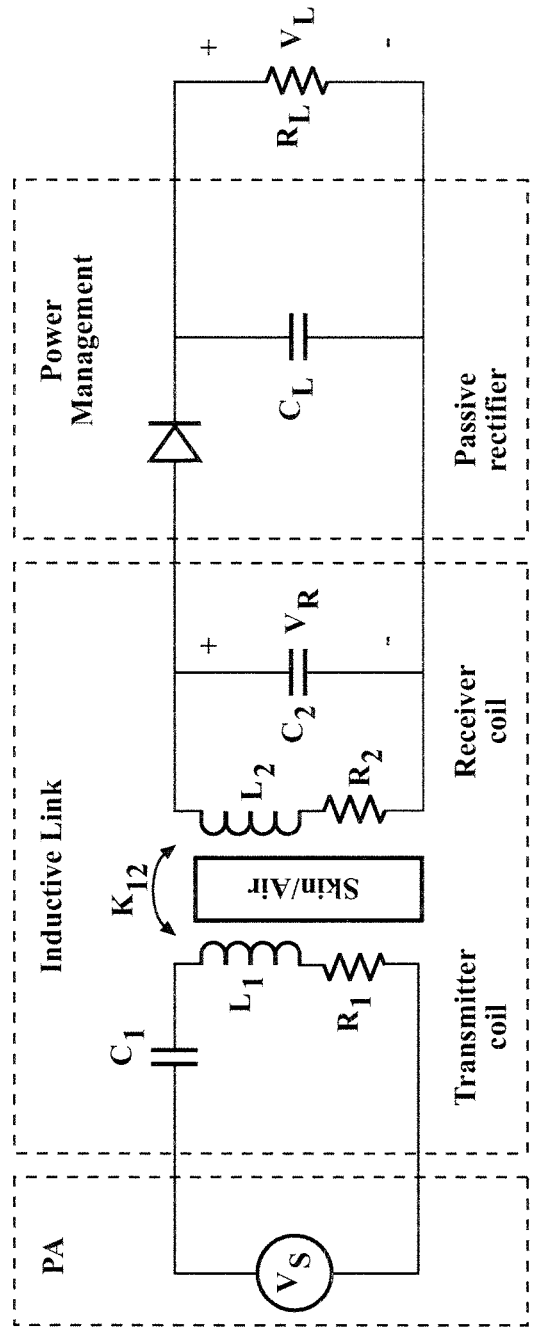
FIG. 1 shows a generic model of a conventional inductive power transmission link.

Reference will now be made in detail to some embodiments of the present invention, examples of which are illustrated in the accompanying drawings. Wherever possible, the same reference numbers will be used throughout the drawings to refer to the same or like parts. Furthermore, it is required that the present invention is understood, not simply by the actual terms used but by the meaning of each term lying within. Additional advantages, objects, and features of the invention will be set forth in part in the description that follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

I. INTRODUCTION

As will be apparent to those skilled in the art that a Rx LC-tank can be used as a current source to overcome the low VCE issue by operating in current mode (CM). In Pennsylvania State University's previous work, called Q-modulation, the Rx LC-tank has been shorted twice in every power carrier period, $T_p$=1/$f_p$, to store energy and then deliver it to the load. Although Q-modulation can increase $V_R$ and, therefore, PTE and PDL by dynamically transforming relatively small $R_L$ (hundreds of ohms) to the optimal load, its VCE is still limited due to the use of a rectifier, and is only suitable for small $R_L$ matching.

Using another approach with a modified multi-carrier Q-modulation, the Rx LC-tank may be shorted for several power carrier cycles without any particular timing, to enable Q-modulation at higher power carrier frequencies. However, unlike the original Q-modulation discussed above, the Rx LC-tank switching in this modified method is synchronized with the power carrier, and again, the VCE obtained has been smaller than one.

Also known is a resonant CM battery charger that is used to recharge a battery from sub-volts AC carriers across the Rx LC-tank. However, this power management is not suitable for direct WPT due to its startup issue, and it achieves low PCE for small $R_L$ and large $V_R$.

Considering a wide range of d, ϕ, and $R_L$ variations in inductive links, therefore, neither VM nor CM power managements can provide the optimal performance. Thus, a reconfigurable voltage/current mode inductive power management (VCIPM) is proposed that can adaptively switch between VM and CM based on $V_R$ amplitude to (1) maximize PCE and PTE, when $R_L$ is small and $V_R$ is larger than the required $V_L$ of 3.2 V; and 2) maximize VCE and PTE for large $R_L$ and small $V_R$<3.2 V. In the proposed VCIPM chip, $V_R$ envelope is first detected and compared with 3.2 V. If $V_{R,peak}$>3.2 V, VM configuration is selected and the power management operates as an active voltage rectifier with high PCE. If $V_{R,peak}$<3.2 V, CM configuration is selected.

In CM, a new current-based resonant power delivery (CRPD) technique is utilized with only one single switch to short the series-connected Rx LC-tank of the inductive link for several power carrier cycles in a unique fashion to use it as a current source. Therefore, an AC-DC voltage conversion with high VCE greater than one can be achieved in the Rx side. This can extend the range of inductive power transmission, particularly for applications that involve low-power consumption in the Rx side, or require a large $V_L$.

The proposed concept includes a proof-of-concept CRPD technique that is implemented with discrete components. In this measurement, CRPD could achieve high VCE of 3.1 V/V at $R_L$=100 kΩ. It could also improve PTE for large $R_L$ (tens of kΩ and above) by transforming $R_L$ to the equivalent parallel resistance of the Rx LC-tank, which is typically in the order of several kΩ and below. Section II below discusses the proposed VCIPM concept. The CRPD concept, circuit theory, and modeling is presented in Section III. The optimization of CRPD-based inductive links is discussed in section IV, VCIPM chip architecture is discussed in Section V, followed by proof-of-concept measurements results in Section VI. The following discussion may refer to the references provided subsequent to Conclusion i.e. Section VII.

A VCIPM prototype chip was fabricated in a 0.35 μm 2P4M standard complementary metal-oxide-semiconductor (CMOS) process to prove functionality of the proposed power management. The VCIPM chip regulates $V_L$ at a desired level of $V_{DD}$ by controlling the back current in VM and the switching frequency in CM, eliminating the need for the regulator and its associated off-chip capacitor. The VCIPM chip also performs over-voltage protection (OVP) along with self-regulation in VM using back current. Therefore, the VCIPM chip only requires two off-chip capacitors, one for resonance, and one for rectification/regulation/OVP. The VCIPM concept is presented in Section II. A. The VCIPM chip circuit design and measurement results are presented in Sections V and VI, respectively.

II. PROPOSED VCIPM CONCEPT

Figure 2:
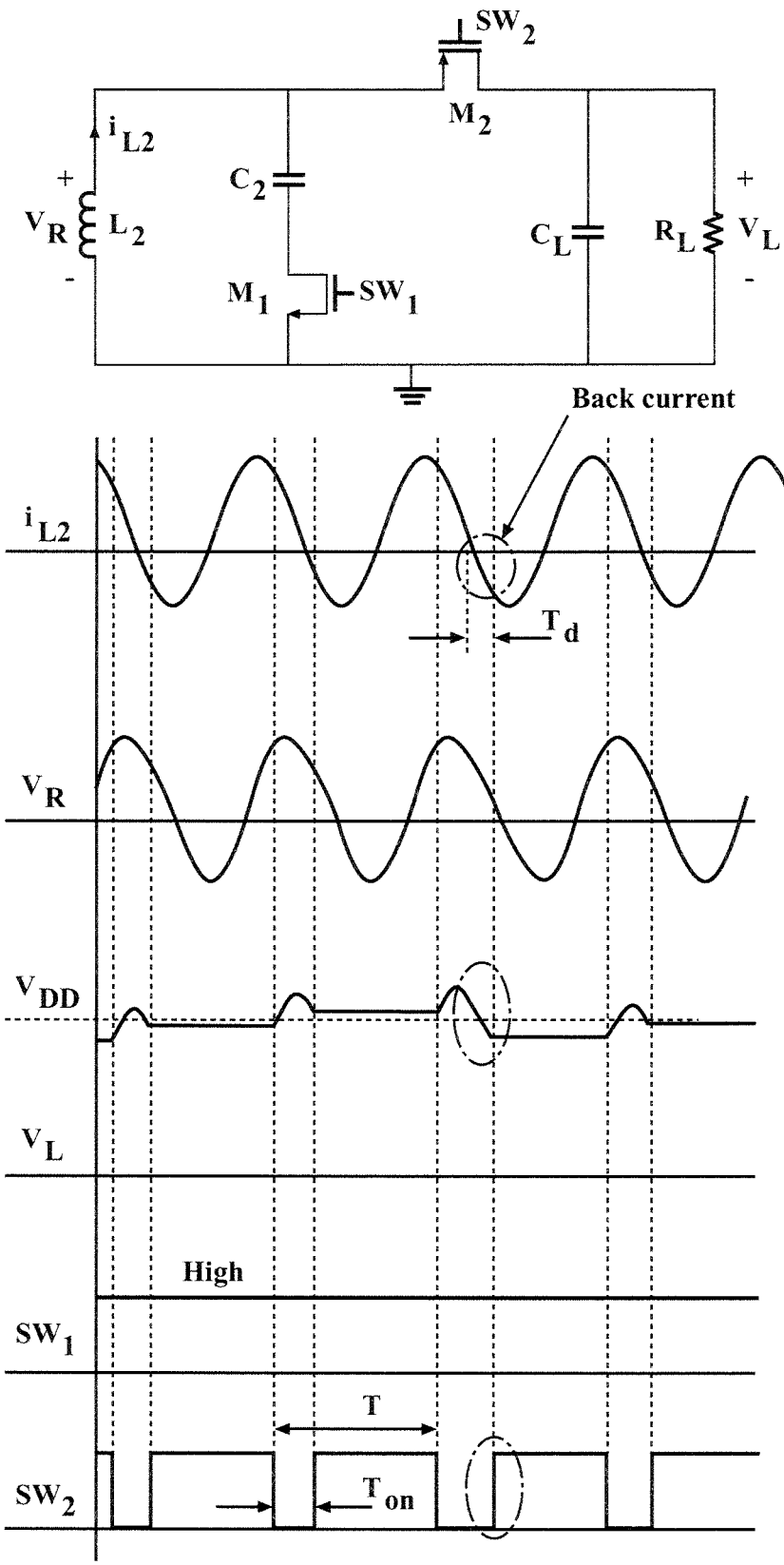
FIG. 2 shows the key waveforms for achieving both rectification and regulation in an active rectifier in proposed technique with employing the back current by increasing $T_{on}$.

The proposed VCIPM operates in either VM or CM based on $V_R$ amplitude. For the cases where $V_R$ is large enough to reach desired $V_L$, VM configuration is chosen to achieve high PCE, otherwise CM is selected to have a functional system. Key operational waveforms in VM are shown in FIG. 2. In VM, $SW_1$ is high ($M_1$: ON), and $V_R$ across the parallel $L_2C_2$-tank is rectified with a synchronous active rectifier, formed by the low-dropout $M_2$ switch and $SW_2$. According to the conventional approach, on time of an active rectifier is utilized to regulate $V_L$ at desired level of $V_{DD}$. This approach encounters serious challenges for conditions where $V_R$ or $R_L$ is large. Because $T_{on}$ decreases drastically, leading to higher power consumption and larger $V_R$ that can damage power management. Thus, conventional structures need another circuit for OVP.

In the proposed VCIPM, back current technique is utilized to solve this problem. As shown in FIG. 2, the proposed technique for rectification, regulation, and OVP—all in one step—employs back current during $T_d$ by maintaining $M_2$ on for longer time periods (larger $T_{on}$) to allow current to flow from $C_L$ to the Rx $L_2C_2$-tank. In other words, extra energy is turned back from $C_L$ to inductor to regulate $V_L$. This technique not only increases $T_{on}$, but also maintains $V_R$ just slightly above $V_{DD}$ by detuning the $L_2C_2$-tank with $C_L$, when $R_L$ is large and/or d and ϕ are small. Therefore, only one off-chip capacitor ($C_L$) is needed for rectification, regulation, and OVP.

III. PROPOSED CURRENT-BASED RESONANT POWER DELIVERY (CRPD) TECHNIQUE

Figure 3:
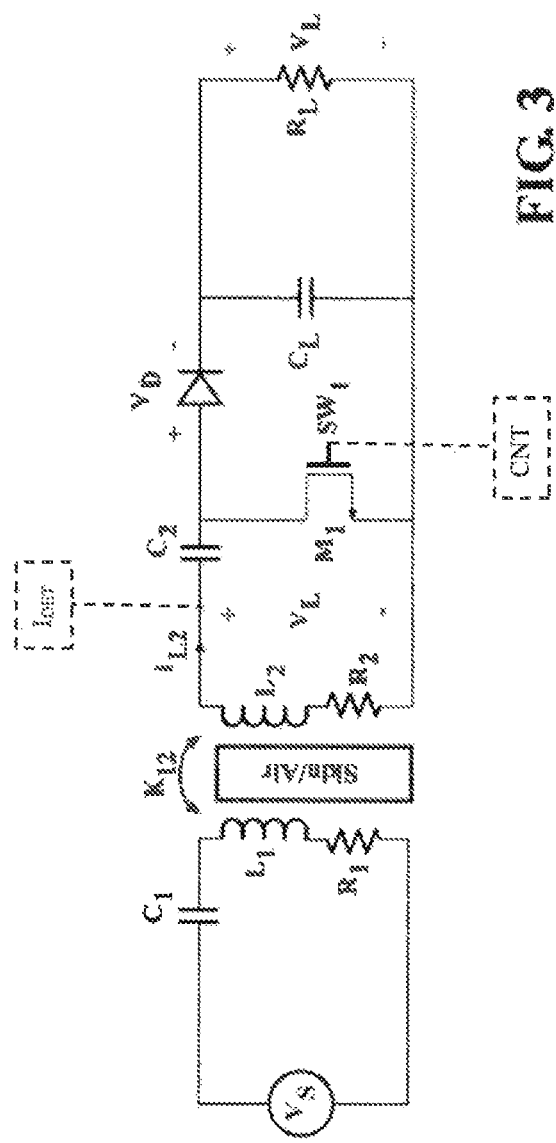
FIG. 3 is a circuit schematic of an inductive link equipped with current-based resonant power delivery (CRPD) according to one embodiment of the present invention.

FIG. 3 shows a circuit schematic of the proposed inductive link, equipped with CRPD. A single switch (M1) is added to the conventional inductive link to short the $L_2C_2$-tank for several power carrier cycles, and then deliver $L_2C_2$-tank energy to the load ($C_L\|R_L$), when the Rx coil current ($i_{L2}$) is at its peak. Compared to the conventional inductive link in FIG. 1, a single switch ($M_1$) has been added in parallel with the series-connected $L_2C_2$-tank, and the power management is represented by a passive rectifier to generate a DC voltage ($V_L$) across the load capacitor and resistor ($C_L\|R_L$). As shown in FIG. 3, in CRPD the $L_2C_2$-tank is connected in series, while in conventional inductive links the $L_2C_2$-tank can be connected in parallel or in series for large and small $R_L$ values, respectively. In some embodiments, a controller (CNT) regulates the switching frequency of the switch ($M_1$). A current sensor $I_{DET}$ detects the current $i_{L2}$ of the $L_2C_2$-tank circuit.

In some embodiments of the present invention, a switch ($M_1$) may be connected with a plurality of $L_2C_2$-tank circuits, such that the plurality of $L_2C_2$-tank circuits may be energizing a load. One or more $L_2C_2$-tank circuits may be connected at any moment with the switch ($M_1$). A $L_2C_2$-tank circuit may be connected with a plurality of switches ($M_1$). In some embodiments, a switch may also be connected with energy sources other than a $L_2C_2$-tank circuit. A switch may be a solid state device such as a transistor, silicon-controlled rectifier, MOSFET, JFET or a triac.

A. CRPD Concept

Figure 4:
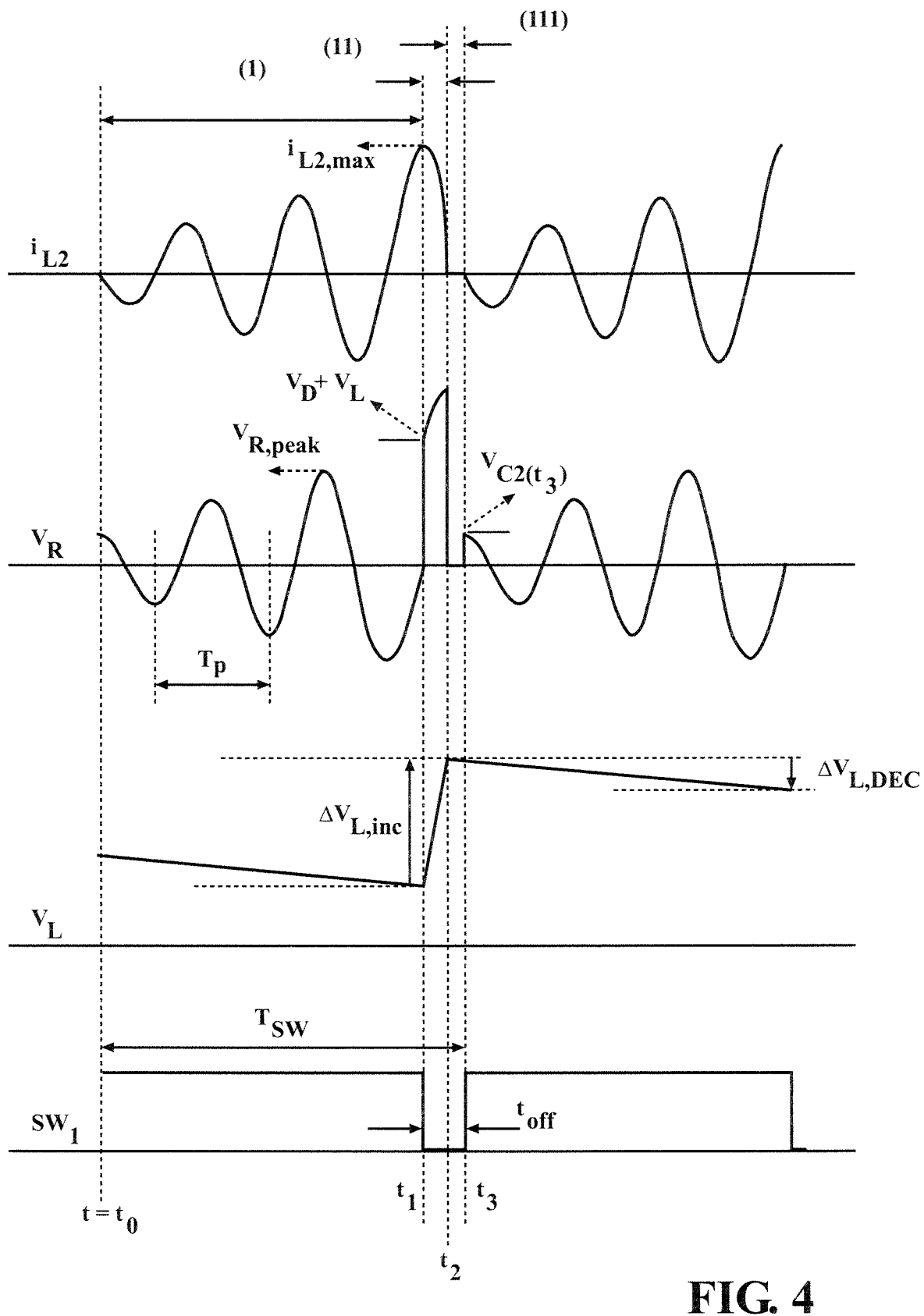
FIG. 4 shows a switching diagram and key waveforms of an embodiment of CRPD to achieve high AC-DC VCE ($V_L/V_{R,peak}$)

FIG. 4 shows a switching diagram and key waveforms of the proposed CRPD, including Rx coil current ($i_{L2}$), $V_R$, $V_L$, and the clock for controlling the $M_1$. The $M_1$ is first closed for several $T_p$s to store energy in the $L_2C_2$-tank. Then, the $M_1$ is opened at the peak of $i_{L2}$ for 0.25 $T_p$ to deliver $L_2C_2$-tank energy to the load. The operation of the CRPD may be divided into 3 regions. In region (I), which is shown as $t_0<t<t_1$ in FIG. 4, the $M_1$ is closed for several power carrier cycles ($T_p=1/f_p$). Therefore, the high-Q $L_2C_2$-tank stores the energy, provided by the inductive link. In region (II), which is shown as $t_1<t<t_2$ in FIG. 4, at the peak of $i_{L2}$, i.e., $i_{L2,max}$, where the voltage across $C_2$ is zero and all the energy is stored in $L_2$, the $M_1$ is opened for less than 0.25 $T_p$ to deliver all the $L_2$ energy to the load. At $t=t_2$, $i_{L2}$ reaches zero and the switching state remains open in region (III), which is shown as $t_2<t<t_3$ in FIG. 4, for $t_3-t_1=0.25$ $T_p$. At $t=t_3$ the next power cycle starts, the $M_1$ is closed again, and $i_{L2}$ starts building up.

The switching timing is key in CRPD, because the $L_2C_2$-tank should have enough time of several $T_p$s to store a high amount of energy, and the energy transfer to the load needs to be started at $i_{L2,max}$ by opening the $M_1$ for $T_{off}=0.25$ $T_p$, as shown in FIG. 4. While the onset of turning the $M_1$ on and off are fixed in the CRPD, its switching frequency, i.e., $f_{sw}=1/T_{sw}$, is a degree of freedom that has been provided by the CRPD, compared with conventional inductive links.

At $t=t_1$, since $V_R$ is zero and the only path for discharging $L_2$ is the rectifier, $V_R$ suddenly increases to $>V_D+V_L$, where $V_D$ represents the forward voltage of the rectifier. The peak voltage of $V_R$ in region (I), i.e., $V_{R, peak}$, does not need to be higher than $V_L$, because the $L_2C_2$-tank is being used as a current source. Therefore, an AC-DC voltage conversion with high VCE, may be achieved. Since the $L_2C_2$-tank is in series with $C_L\|R_L$ in regions (II) and (III) and $C_L$ is much larger than $C_2$, $L_2$ may be fairly assumed at resonance in the proposed CRPD according to the present invention. In addition, since the duration of regions (II) and (III) are much shorter than that of region (I), the $L_2C_2$-tank resonance and quality factor may be approximated to those in region (I).

It should be noted that in CRPD since the Rx LC-tank is shorted for several cycles, during which $L_2$ cannot deliver power to $R_L$, a larger $R_L$ value might be used as this demands less power. For applications with a small $R_L$, in region (I) where only $C_L$ provides power for $R_L$, $V_L$ decreases significantly and, therefore, the steady-state $V_L$ could be smaller than $V_{R, peak}$ in FIG. 4.

B. The Circuit Theory Behind CRPD

Figure 5A:
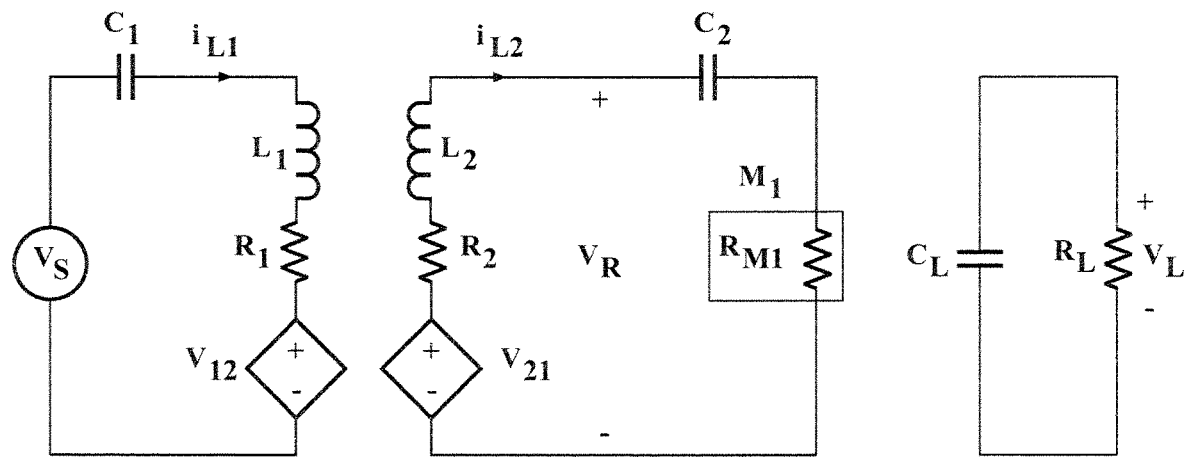
FIG. 5A is an embodiment of a CRPD-based inductive link model with a closed switch ($M_1$) in accordance with region (I) of FIG. 4.
Figure 5B:
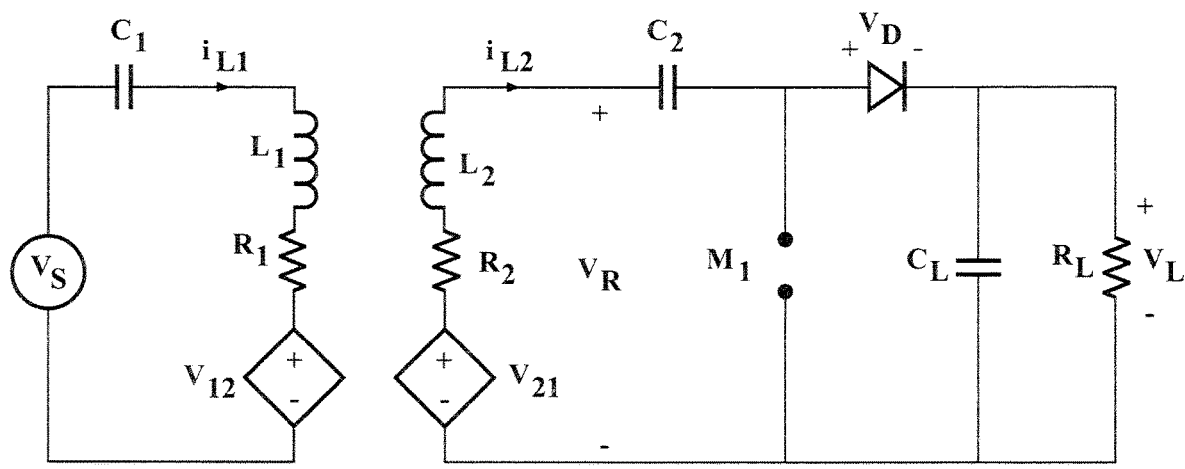
FIG. 5B shows an embodiment of a CRPD-based inductive link model with an open switch ($M_1$) in accordance with region (II)-(III) of FIG. 4.

FIGS. 5A and 5B show the inductive link model in regions (I) and (II)-(III), respectively, to find $i_{L2}$, $V_L$, and PTE. Since the $M_1$ is open in both regions (II) and (III), the equivalent circuit in FIG. 5A may be used for both regions. The mutual inductance between $L_1$ and $L_2$, i.e., $M_{12}$, may be modeled with $V_{12}=-j\omega_p \times M_{12} \times I_{L2}$ and $V_{21}=j\omega_p \times M_{12} \times I_{L1}$ in Tx and Rx sides, where $\omega_p=2\pi/T_p=2\pi f_p$ is the power carrier frequency, and $I_{L1}$ and $I_{L2}$ are the amplitude of sinusoidal currents in $L_1$ and $L_2$, respectively.

As shown in FIG. 5A, the $M_1$ is closed for a predetermined period thus disconnecting load $R_L$ from the $L_2C_2$-tank. During the pre-determined period, the energy provided by the inductive link is stored in the $L_2C_2$-tank. As shown in FIG. 5B, the $M_1$ is opened after the pre-determined period and the $L_2C_2$-tank gets connected with load $R_L$. Now all the energy stored in the $L_2C_2$-tank is delivered to load $R_L$. FIG. 5B shows a diode and a capacitor i.e. passive rectifier as part of the power management on the load end. Some embodiments according to the present invention may use another power management scheme having a different circuit configuration.

Since the duration of region (I) is much longer than that of regions (II)-(III), the $L_2C_2$-tank may be considered at resonance in the CRPD, and $I_{L1}$ and $I_{L2}$ in steady state may be found from the region (I) circuit model in FIG. 5A, $$\left(\frac{1}{j\omega_p C_1} + j\omega_p L_1 + R_1\right)I_{L1} + V_{12} = |V_s| \quad (1)$$
$$\left(\frac{1}{j\omega_p C_2} + j\omega_p L_2 + R_2 + R_{M1}\right)I_{L2} - V_{21} = 0,$$

where $R_{M1}$ is the switch resistance and $|V_s|$ is the amplitude of the source, $V_s$. At resonance, $\omega_p=1/(L_1C_1)^{1/2}=1/(L_2C_2)^{1/2}$ and, therefore, the amplitude of $V_{21}$ in steady state may be found from, $$|V_{21}| = |V_s|M_{12}\omega_p \Big/ \left(R_1 + \frac{(M_{12}\omega_p)^2}{R_2+R_{M1}}\right) = \quad (2)$$
$$\frac{|V_s|k_{12}Q_1\sqrt{L_2}/\sqrt{L_1}}{1+k_{12}^2 Q_1 Q_{2eq}} = \frac{|V_s|k_{12}\sqrt{Q_1 Q_2}\sqrt{R_2}}{(1+k_{12}^2 Q_1 Q_{2eq})\sqrt{R_1}},$$

where $k_{12}=M_{12}/(L_1L_2)^{1/2}$, $Q_1=\omega_p L_1/R_1$, and $Q_{2eq}=\omega_p L_2/(R_2+R_{M1})$ is the equivalent Q of $L_2$ in region (I). Therefore, the Tx side may be considered as a sinusoidal source, i.e., $V_{21}$, in (2), in the Rx side.

In order to maximize $i_{L2}$ and $V_R$ in region (I) of FIG. 4, which may increase $V_L$, one may maximize $|V_{21}|$ in equation (2) for a given $|V_s|$ since $i_{L2}=|V_{21}|/(R_2+R_{M1})$ in region (I). Therefore, at large distances where $k_{12}$ is quite small, $k_{12}$, $Q_1$, and $Q_2$ may be maximized, while $R_2+R_{M1}$ may be minimized to maximize $i_{L2}$ and, consequently $V_L$.

The transient $i_{L2}(t)$ in regions (I) and (II)-(III), which is associated with circuits in FIGS. 5a and 5b, may be found from, $$V_{21}(t) = L_2 \frac{di_{L2}(t)}{dt} + \frac{1}{C_2}\int i_{L2}(t)dt + (R_2 + R_{M1})i_{L2}(t), \quad (3)$$

$$V_{21}(t) - V_D = \quad (4)$$
$$L_2 \frac{di_{L2}(t)}{dt} + \frac{1}{C_2}\int i_{L2}(t)dt + \frac{1}{C_L}\int i_{L2}(t)dt + (R_2 + R_D)i_{L2}(t),$$

respectively, where $R_D$ represents the resistance of the rectifier. To find equation (4), $R_L$ may be safely ignored compared to $C_L$, because $C_L$ may be chosen large enough to reduce the voltage ripples across $R_L$. One may also ignore $C_L$ in equation (4) as it is much larger than $C_2$ in inductive links.

The solution for $i_{L2}(t)$ in region (I) for $t_0<t<t_1$ may be written as, $$i_{L2}(t)=\exp(\alpha(t-t_0))[A_1\cos(\omega_d(t-t_0))+A_2\sin(\omega_d(t-t_0))]- A_3\sin(\omega_p(t-t_0)), \quad (5)$$

where $\alpha$ and $\omega_d$ may be found from, $$\alpha = -\frac{\omega_p}{2Q_{2eq}}, \omega_d = \frac{\omega_p}{2Q_{2eq}}\sqrt{4Q_{2eq}^2 - 1}. \quad (6)$$

The particular solution for $i_{L2}$, which is originated from $|V_{21}|$ in equation (2), determines $A_3$, while $A_1$ and $A_2$ may be found from the initial conditions of $i_{L2}$. Therefore, $A_{1-3}$ in equation (5) may be found from, $$A_1=i_{L2}(t_0)=0, A_2=(-V_{C2}(t_0)/L_2-\alpha A_1+A_3\omega_p)/\omega_d, \quad (7)$$

and $A_3=|V_{21}|/(R_2+R_{M1})$, where $V_{C2}(t_0)$ is the initial voltage across $C_2$ in each switching cycle, which is the same as $V_{C2}(t_3)$ in region (III) from the previous cycle as shown in FIG. 4. At startup, $V_{C2}(t_0)$ in equation (7) may be set to zero. It can be seen that in order to increase $i_{L2}$ in equation (5), $A_3$ may be maximized by increasing $|V_{21}|$ in equation (2) and reducing $R_2+R_{M1}$. This implies that $k_{12}$, $Q_1$, and $Q_{2eq}$ may be maximized.

In region (I), $C_L$ is the only source that delivers power to $R_L$ and, therefore, $V_L$ may slowly decrease for the amount of $\Delta V_{L,\,dec}$ as shown in FIG. 4. One may find $\Delta V_{L,dec}$ from, $$\Delta V_{L,dec} = V_L(t_0)\left(1 - \exp\left(\frac{-T_{sw}+T_{off}}{R_L C_L}\right)\right) \quad (8)$$

where $T_{sw}=1/f_{sw}$ and $T_{off}=0.25\,T_p$ are the switching time period and the switch turn-off duration, respectively.

The solution for $i_{L2}(t)$ in region (II) for $t_1<t<t_2$ may be found by solving equation (4) as, $$i_{L2}(t)=B\exp(\alpha(t-t_1))\cos(\omega_d(t-t_1)-\theta)+A_3\cos(\omega_p(t-t_1)), \quad (9)$$

where $A_3$ is almost equal to $|V_{21}|/(R_2+R_D)$ for large $C_L$, and $$B = \sqrt{\left(\frac{di_{L2}(t_1)/dt - \alpha(i_{L2}(t_1)-A_3)}{\omega_d}\right)^2 + (i_{L2}(t_1)-A_3)^2}, \quad (10)$$

$$\theta = \tan^{-1}\left(\frac{di_{L2}(t_1)/dt - \alpha(i_{L2}(t_1)-A_3)}{\omega_d(i_{L2}(t_1)-A_3)}\right),$$

$$\frac{di_{L2}}{dt} = \frac{|V_{21}| - (V_{C2}(t_1)+V_L(t_1)+V_D+(R_2+R_D)i_{L2}(t_1))}{L_2}.$$

In equation (10), $i_{L2}(t_1)$ may be found from equation (5), and $V_{C2}(t_1)$ is the voltage across $C_2$ in region (I) and may be found from, $$V_{C2}(t_1) = \frac{1}{C_2}\int_{t_0}^{t_1} i_{L2}(t)dt + V_{C2}(t_0), \quad (11)$$

by using $i_{L2}$ in equation (5). The time that $i_{L2}$ takes in equation (9) to approach zero, i.e., $t=t_2$ in FIG. 4, may be approximately found from, $$t_2-t_1=(\pi/2-\theta)/\omega_d, \quad (12)$$

if $|V_{21}|$ is ignored in region (II), i.e., $A_3=0$, since the total stored energy in the $L_2C_2$-tank in region (II) is much larger than the energy provided by small $V_{21}$, particularly at large distances, where $k_{12}$ in equation (2) is relatively small.

In region (II), where $i_{L2}$ is nonzero and the $L_2C_2$-tank is connected to the load, $L_2$ may deliver power to $C_L \| R_L$. Therefore, $V_L$ may gradually increase by discharging $L_2$ energy into $C_L$. The amount of $\Delta V_{L,inc}$ as shown in FIG. 4 may be found from, $$\Delta V_{L,inc} = \int_{t_1}^{t_2} i_{L2}(t)dt/C_L, \quad (13)$$

by using $i_{L2}$ in equation (9).

In region (III), the rectification diode forces $1_{L2}$ to remain zero, which may in turn maintain $V_{C2}$ constant for $t_2 < t < t_3$. Therefore, $V_{C2}(t_0)$ in equation (7) for the next switching cycle may be found by calculating $V_{C2}$ at $t=t_3$ or $t_2$ from, $$V_{C2}(t_0) = \frac{1}{C_2}\int_{t_1}^{t_2} i_{L2}(t)dt + V_{C2}(t_1), \quad (14)$$

by using $i_{L2}$ in equation (9). Region (III) may be added for the duration of $(t_3-t_1)=T_{off}=0.25\ T_p$ to ensure that $L_2$ is completely discharged into $C_L$, which eliminates the need and power consumption for sensing the zero-crossing times of $i_{L2}$.

TABLE I

CRPD-BASED INDUCTIVE LINK PARAMETERS USED IN SIMULATIONS

| Parameter | Value | Parameter | Value |
|---|---|---|---|
| $L_1/L_2$ (µH) | 205/4.2 | $k_{12}$ | 0.01 |
| $R_1/R_2$ (Ω) | 30/1.1 | $C_L$ (nF) | 100 |
| $C_1/C_2$ (nF) | 0.123/6 | $R_L$ (kΩ) | 100 |
| $|V_s|$ (V) | 1.5 | $T_{off}$ (ns) | 250 |
| $R_D|R_{M1}$ (Ω) | 0/1 | $f_{sw}$ (kHz) | 50 |
| $V_D$ (V) | 0.4 | $f_p$ (MHz) | 1 |

According to equations (8) and (13), $V_L$ may decrease in region (I) and increase in region (II) for each switching cycle ($T_{sw}$). Therefore, the final value of $V_L$ after n switching cycles may be found from, $$V_L(t=nT_{sw}) = \sum_{i=1}^{n} [\Delta V_{L,inc}(i) - \Delta V_{L,dec}(i)], \quad (15)$$

where $\Delta V_{L,\ dec}$ (i) and $\Delta V_{L,\ inc}$ (i) may be calculated from equations (8) and (13) for each $T_{sw}$, respectively.

The PTE of the CRPD-based inductive link in FIG. 3 may be defined as the power delivered to $R_L$, $P_L=V_L^2/R_L$, divided by the power provided by $V_s$, $P_s$. At steady state, the final value for $V_L$ may be calculated from equation (15) to find $P_L$. Since the $L_2C_2$-tank is mostly shorted in the CRPD-based link, the link model in FIG. 5A may be used to find $P_s$. In FIG. 5A, the $L_2C_2$-tank may be modeled in the Tx side as a reflected impedance [20], $$R_{ref}=k_{12}^2\omega_p^2 L_1 Q_{2eq}=k_{12}^2 Q_1 Q_{2eq} \times R_1, \quad (16)$$

in series with $R_1$. Since $L_1$ is canceled out by $C_1$ at resonance, the PTE of the CRPD-based inductive link may be written as, $$PTE = \frac{V_L^2/R_L}{0.5|V_s|^2/(R_1+R_{ref})} = 2\left|\frac{V_L}{V_S}\right|^2 \cdot \frac{R_1}{R_L}(1+k_{12}^2 Q_1 Q_{2eq}). \quad (17)$$

C. Theory vs. Simulations

In order to demonstrate the functionality of the CRPD and verify the accuracy of the proposed circuit theory, the CRPD-based inductive link in FIG. 3 was simulated in the Cadence Spectre circuit simulator (Cadence Technology, San Jose, Calif.), and compared with the calculation results based on the theory. Table I summarizes the circuit parameters that were used in these simulations. The amplitude of $V_s$ operating at $f_p$ of 1 MHz may be set to 1.5 V to achieve $V_R$ amplitude of 1 V when the $M_1$ was always closed. This implies that a conventional inductive link may achieve $V_L<1$ V for such settings.

Figure 6:
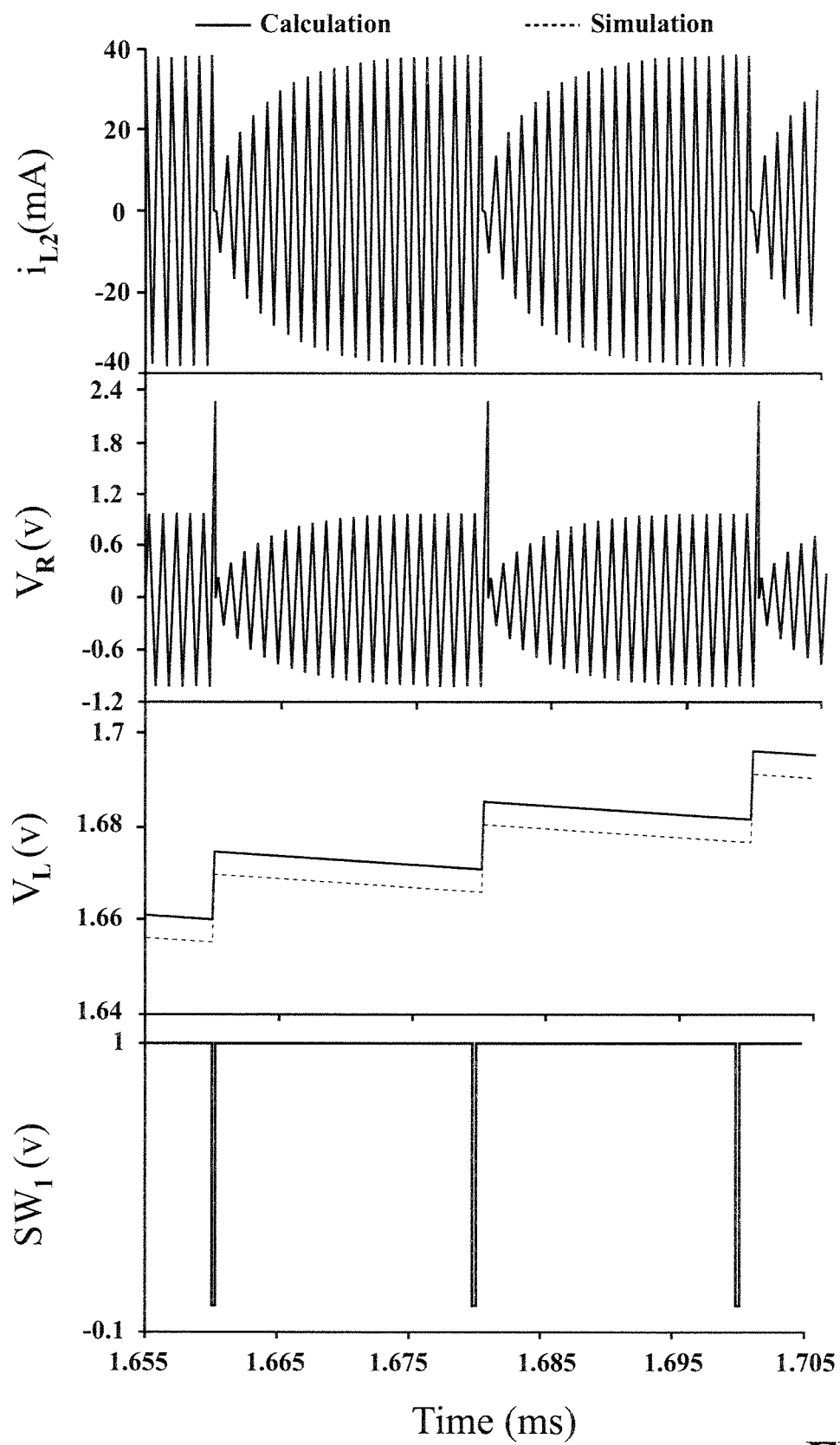
FIG. 6 shows simulated and calculated results for key signals of an embodiment of the CRPD-based inductive link shown in FIG. 4, when $M_1$ was switched at $f_{sw}$=50 kHz.
Figure 7:
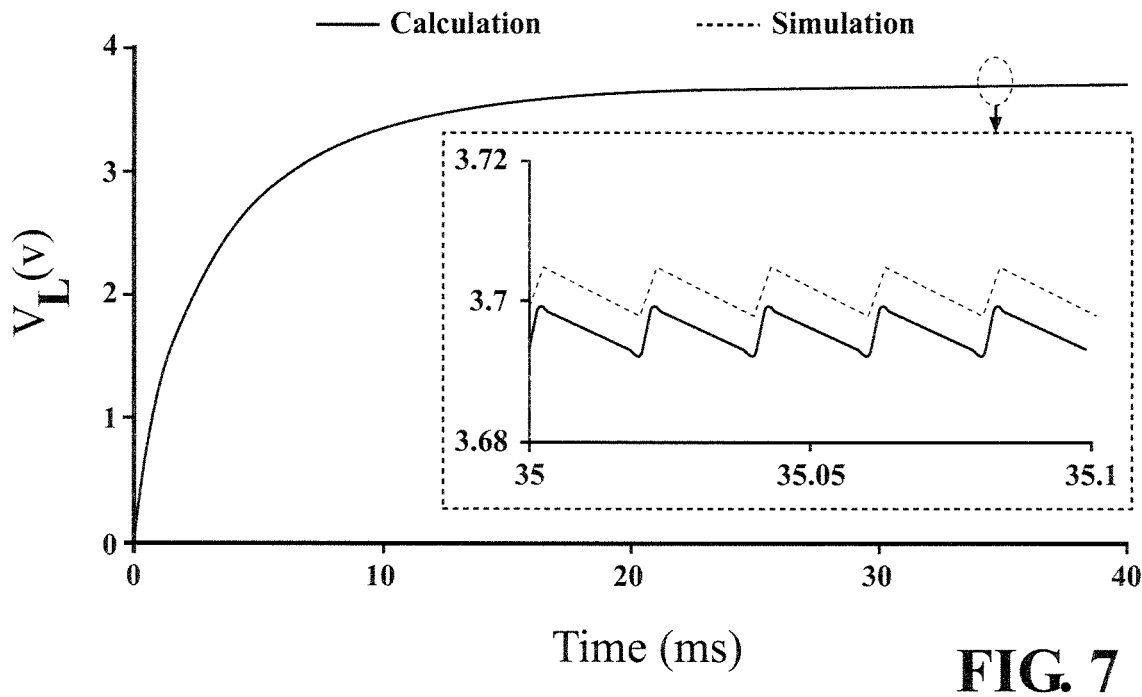
FIG. 7 is a graphical representation of simulated and calculated $V_L$ vs. time for an embodiment of a CRPD-based inductive link, when $V_{R,peak}$ was 1 V.

FIG. 6 shows the simulated and calculated results for $i_{L2}$, $V_R$, $V_L$, and the $SW_1$ during 50 µs of operation, when the $M_1$ was switched at the rate of $f_{sw}=50$ kHz. The circuit parameters for FIG. 6 and FIG. 7 are based on Table I. Although the peak amplitude of $V_R$ ($V_{R,peak}$) during $L_2C_2$-tank energy storage ($M_1$: closed) is ~1 V, $V_L$ may reach to ~1.7 V due to a sudden increase in $V_R$ to >2.3 V to compensate for $V_L+V_D=2.1$ V, and may provide a path for discharging $L_2$ into $C_L$. It can be seen in FIG. 6 that the calculated results match with the simulations. The slight errors in the calculated $V_L$ may be due to the approximations that were made in finding the initial conditions.

FIG. 7 shows the simulated and calculated waveforms for $V_L$ at $f_{sw}=50$ kHz, when $V_{R,peak}$ was as small as 1 V. It can be seen that $V_L$ has reached to ~3.7 V in steady state, which results in an AC-DC VCE of 3.7 due to the optimal control of the $SW_1$ in the CRPD. FIG. 7 inset also shows the ripples on $V_L$ in steady state, in which $\Delta V_{L,\ dec}$ and $\Delta V_{L,\ inc}$ in equation (15) have cancelled out each other.

As shown in FIG. 7, the rate of increase in $V_L$ is relatively faster at the startup, where $V_L$ is relatively small, because 1) according to equation (8), $\Delta V_{L,dec}$ is proportional to $V_L$ and, therefore, $\Delta V_{L,dec}$ is quite small at low $V_L$, and 2) $\Delta V_{L,inc}$ in equation (13) is proportional to $i_{L2}$ values within $t_1 < t < t_2$, which decay at a lower rate at low $V_L$, where the voltage on $L_2$ is smaller and, therefore, $\Delta V_{L,inc}$ is larger at low $V_L$. However, as $V_L$ increases, $\Delta V_{L,\ dec}$ may increase and $\Delta V_{L,\ inc}$ may decrease, until they become equal, resulting in a steady-state value for $V_L$.

IV. DESIGN PROCEDURE FOR PROPOSED CRPD-BASED INDUCTIVE LINK

In order to maximize VCE and PTE of the CRPD-based inductive link, the power loss in both Tx and Rx sides may be minimized. In the Rx side, the optimal $f_{sw}$ may ensure that $V_L$ and consequently $P_L=V_L^2/R_L$ may be maximized for a given $V_R$, leading to higher VCE and lower power loss in Rx. As shown in Section III. A, the amount of rectifier voltage drop ($V_D$) and $R_2+R_{M1}$ may be minimized to increase $V_L$. Since the $L_2C_2$-tank is mostly shorted in the CRPD-based link, the link model in FIG. 5a may be used to find the power loss in the Tx side. By modeling the $L_2C_2$-tank in the Tx side with $R_{ref}$ in equation (16), the power efficiency in the Tx side may be found from, $$\eta_{Tx}=R_{ref}/(R_1+R_{ref})=k_{12}^2Q_1Q_{2eq}/(1=k_{12}^2Q_1Q_{2eq}). \quad (18)$$

Since the proposed CRPD may enable extended-range inductive power transmission, the Tx and Rx coils are weakly coupled at large distances and, therefore, $k_{12}$ may be relatively small. In this condition, $\eta_{Tx}$ may be simplified to $k_{12}^2Q_1Q_{2eq}$. Therefore, the proposed design procedure in FIG. 8 may include two parts, 1) maximizing $k_{12}^2Q_1Q_{2eq}$ by optimizing $L_1$ and $L_2$ geometries to reduce the power loss in the Tx side, and 2) reducing $V_D$ and $R_{M1}$, and optimizing $f_{sw}$ to increase $V_L$. It may be noted that maximizing $k_{12}^2Q_1Q_{2eq}$ may also increase $V_R$ and $V_L$ at large distances, because $i_{L2}$ in equation (7) may depend on $A_3$, which may be simplified to $$A_3 = \frac{|V_{21}|}{R_2+R_{M1}} = \frac{|V_s|k_{12}Q_1\sqrt{L_2}/\sqrt{L_1}}{R_2+R_{M1}} = \frac{|V_s|k_{12}Q_1Q_{2eq}}{\omega_p\sqrt{L_1L_2}}, \quad (19)$$

where $k_{12}$ is considered small.

Reference [20] shows that at short distances, which involve large $k_{12}$, the optimal geometries for Tx and Rx coils that may maximize $V_L$ and PTE can potentially be different. Tx and Rx coils geometries can be optimized to maximize $\eta_{Tx}$ in equation (18) using the design procedure that has been presented in reference [20]. However, at large distances a single set of Tx and Rx coils geometries may maximize both $V_L$ and PTE. Therefore, in the CRPD that is suitable for large distances, maximizing $V_L$ based on the design procedure in FIG. 8 may also lead to maximum PTE.

A designer may make the coils as lithographically defined or wire-wound. The geometrical parameters of the printed spiral coils (PSC) that affect circuit parameters such as Q and k are the line width (w), line spacing (s), outer diameter ($D_o$), and fill factor ($\phi$: the ratio between the difference and the sum of a PSC' s inner and outer diameters), which have been described in reference [6]. In wire-wound coils (WWC) made of single filament solid wires, w is the wire diameter, the number of turns (n: integer) may be used instead of $\phi$, and s may be twice the thickness of the wire insulation. The relationship between circuit parameters and the coil geometries in this case may be found in reference [21].

Figure 8:
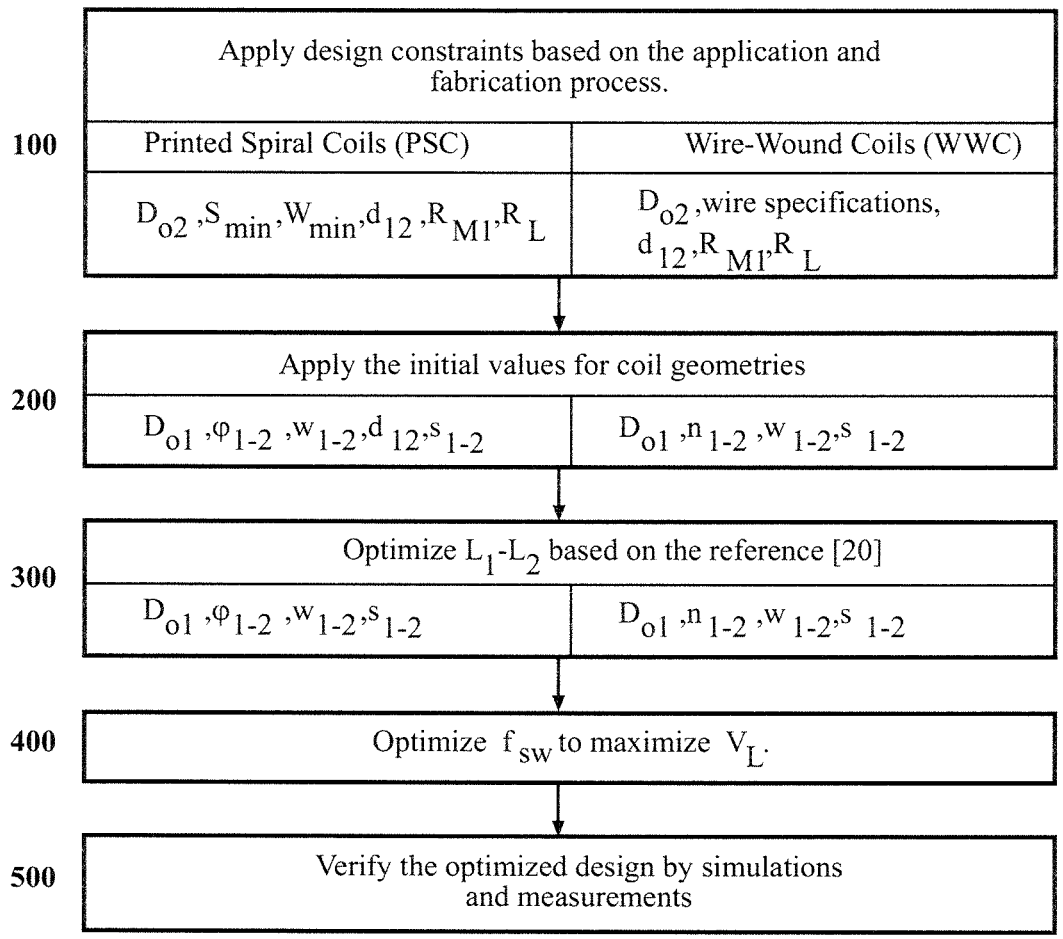
FIG. 8 is a design optimization flowchart for a proposed CRPD-based inductive link.

In step-1 100 of the design procedure in FIG. 8, design constraints imposed by the application and coil fabrication technology may be considered. The former may define the maximum value for Rx coil diameter, $D_{o2}$, while the latter may indicate the minimum line width and line spacing ($w_{min}$, $s_{min}$) in the case of PSC, or the wire specifications in WWC. The nominal values for coupling distance ($d_{12}$), $R_{M1}$, and $R_L$ are also required in this step, which are application dependent on the application.

In step-2 200, the initial values for $L_1$ and $L_2$ geometries may be chosen, including ($w_{1,2}$, $w_{1,2}$, $\phi_{1,2}$, $D_{o1}$) and ($w_{1,2}$, $s_{1,2}$, $n_{1,2}$, $D_{o1}$) for PSCs and WWCs, respectively. A detailed discussion about how to choose initial values can be found in references [6] and [20]. In step-3 300, the geometries of $L_1$ and $L_2$ may be optimized to maximize $k_{12}^2Q_1Q_{2eq}$ based on the iterative design procedure that is presented in reference [20] using k and Q equations for PSCs and WWCs in references [6] and [21], respectively. This involves sweeping different parameters of $L_1$ and $L_2$ in an iterative process and finding the maximum value for $k_{12}^2Q_1Q_{2eq}$ in each step, which has been discussed in references [6], [20], and [21].

In step-4 400, $f_{sw}$ may be swept to find the final value for $V_L$ in equation (15) for $|V_s|=1$ V using the optimal coil geometries from step-3 300. The optimal $f_{sw}$ that maximizes $V_L$ may be chosen in this step. Step-4 400 may determine optimal coil geometries and $f_{sw}$ to achieve highest $V_L$ and PTE in the CRPD, which may be further validated and fine-tuned through simulations and measurements in step-5 500. Thus, the design procedure concludes at the end of step-5 500.

V. VCIPM CHIP ARCHITECTURE

Figure 9:
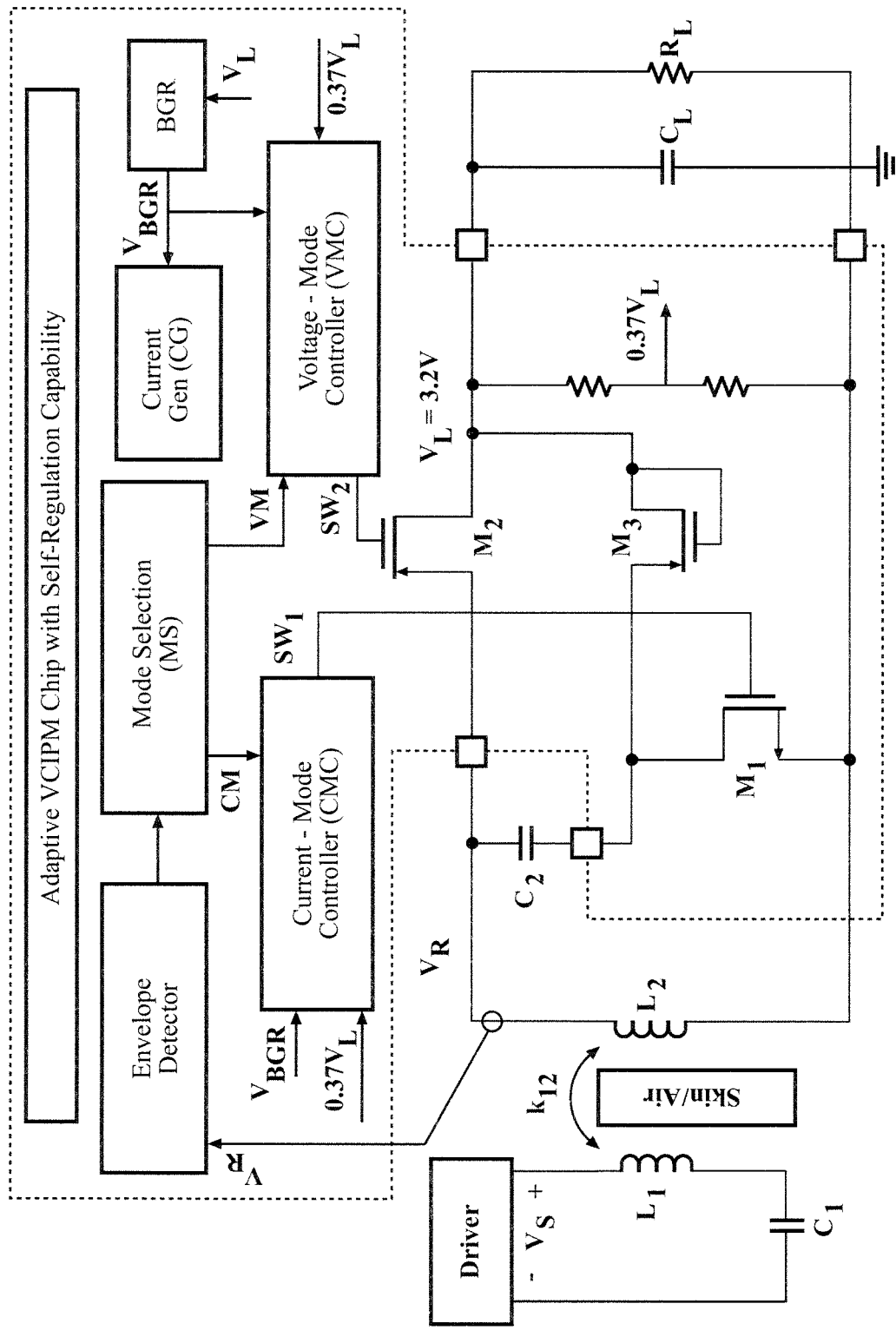
FIG. 9 is a block diagram of the proposed adaptive reconfigurable VCIPM chip that operates either in VM or CM based on $V_R$ amplitude, and can perform rectification, regulation, and OVP all in one step using one off-chip capacitor ($C_L$)

FIG. 9 shows the block diagram of a prototype VCIPM chip, which was designed at the $f_p$ of 1 MHz to regulate $V_L$ at $V_{DD}$=3.2 V. The VCIPM chip operates in either VM or CM based on the $V_R$ amplitude using $M_2$ or $M_1$ and $M_3$ transistors, respectively, and performs rectification, regulation, and OVP all in one step with a single off-chip capacitor ($C_L$). In VCIPM chip, a passive envelope detector first detects $V_R$ amplitude. Then, a mode selection (MS) block determines whether VCIPM chip should operate in VM (if $V_R$>3.2 V) or CM (if $V_R$≤3.2 V) by enabling voltage-mode controller (VMC) or current-mode controller (CMC) blocks, respectively. If VMC is enabled, $M_1$ (W/L=2.5 mm/0.6 μm) is turned on by setting $SW_1$=3.2 V, and $M_2$ (W/L=0.5 mm/0.6 μm) is controlled by $SW_2$ to form a half-wave active rectifier as shown in FIG. 2. In VM, diode-connected $M_3$ (W/L=10 mm/0.6 μm) is always off, because its source-gate voltage is negative. If CMC is enabled, $M_2$ is turned off by setting $SW_2$=3.2 V, and $M_1$ is controlled by $SW_1$ as shown in FIG. 4. Self-regulation will also be achieved in VMC and CMC by adjusting $SW_2$ and $SW_1$ pulses, respectively. A bandgap reference (BGR) provides a constant 1.2 V, from which a reference bias current of 60 nA is generated by a current generator (CG).

Figure 10A:
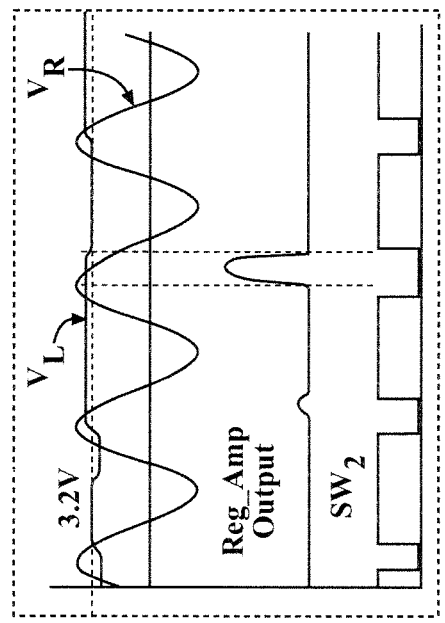
FIG. 10A is a schematic diagram and key waveform of a voltage mode controller (VMC) in a VCIPM chip to generate a proper $SW_2$ pulse.
Figure 10A:
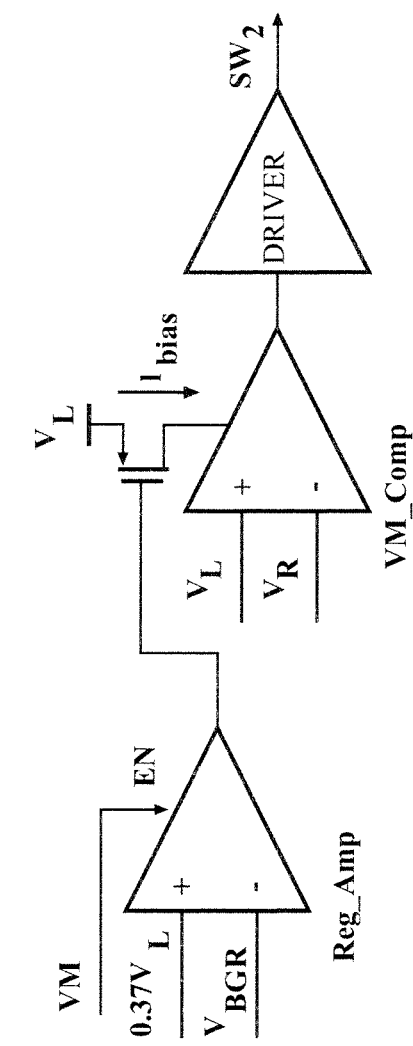
Figure 10B:
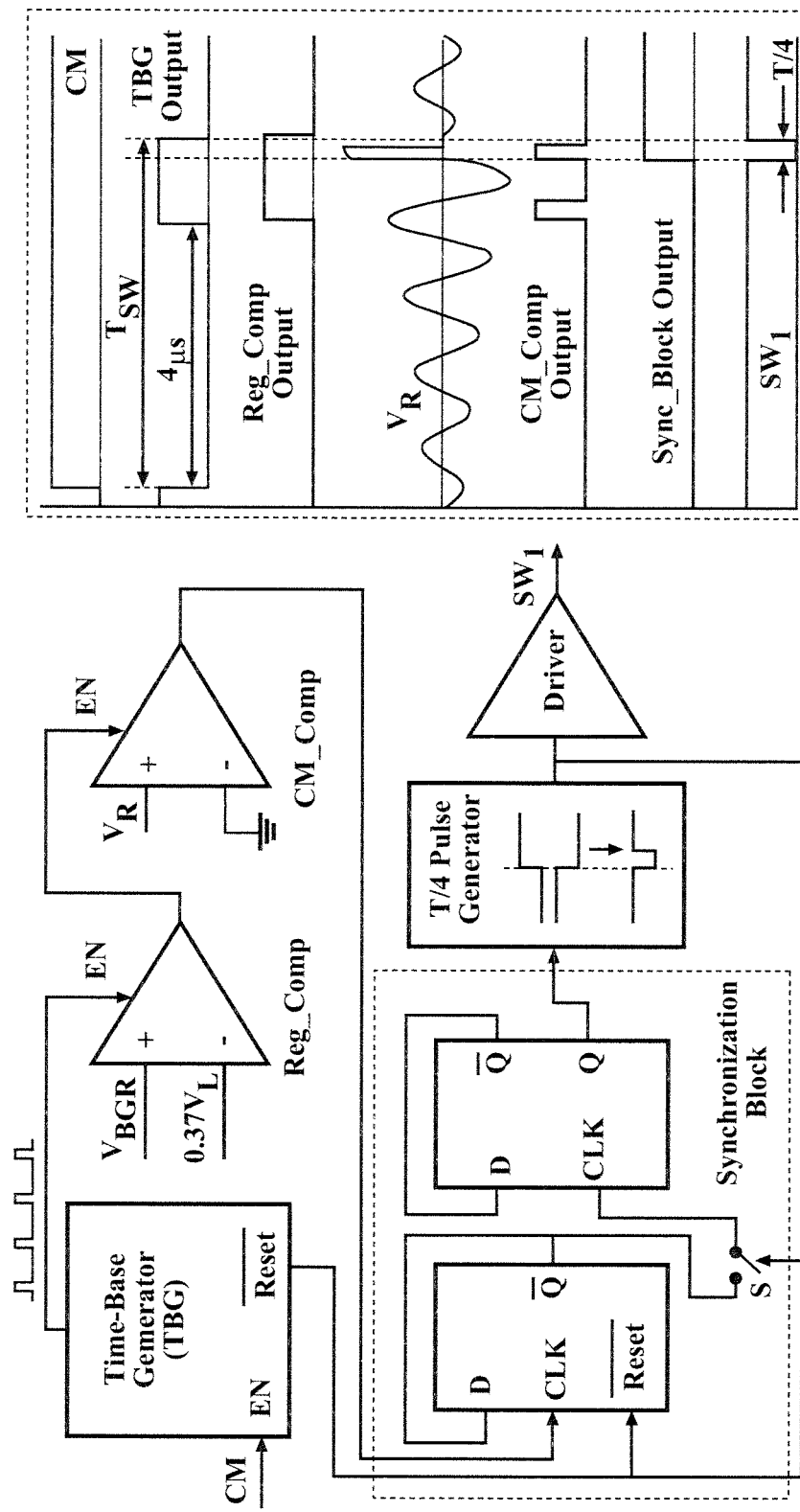
FIG. 10B is a schematic diagram and key waveform of a current mode controller (CMC) in a VCIPM chip to generate a proper $SW_1$ pulse.

FIGS. 10A and 10B show the block diagrams and key operational waveforms of VMC and CMC, respectively. In VMC, a regulation amplifier (Reg_Amp in FIG. 10a), controlling the bias current ($I_{bias}$) of the active rectifier comparator (VM_Comp), amplifies the difference between $V_L$ and required $V_{DD}$=3.2 V by comparing 0.37×$V_L$ with $V_{BGR}$=1.2 V. If $V_L$<3.2 V, this amplifier outputs low and $I_{bias}$ is maximized. Therefore, VM_Comp operates at its maximum speed with minimal back current, i.e., as an efficient active rectifier, to charge $C_L$ and increase $V_L$. When $V_L$ surpasses 3.2 V, Reg_Amp reduces $I_{bias}$, slowing down CM_Comp in turn-off, that allows back current from $C_L$ to $L_2C_2$-tank by increasing the width of $SW_2$ pulses ($T_d$ in FIG. 2), as it can be clearly seen in FIG. 10a inset waveforms.

In CMC as showing in FIG. 10B, a time-base generator (TBG), whenever it is reset, outputs a high pulse after 4 μs to enable a regulation comparator (Reg_Comp) that compares 0.37×$V_L$ with $V_{BGR}$=1.2 V. If $V_L$<3.2 V, the CM comparator (CM_Comp) with an intentional offset of 170 mV is enabled by Reg_Comp to detect the time zero-crossings of $V_R$, where $i_{L2}$ reaches its maximum, with the help of a synchronization block and consequently generates a sharp $SW_1$ pulse to charge $C_L$ through $M_3$. The synchronization block includes two cascaded D-flip-flops that count two pulses to generate a transition, which is then converted to a short pulse (active low) with the width of $T_p/4$ by a pulse generator block. The pulse-generator output controls $M_1$ with a driver ($SW_1$ pulses), and also resets D-flip-flops and TBG for the same process to be repeated. FIG. 10b inset shows how synchronization block can eliminate false CM_Comp pulses, which are not at the time zero-crossings of $V_R$. The intentional offset in CM_Comp compensates for the circuit delays in CMC path, ensuring $M_1$ switching occurs at $i_{L2}$ peaks. If $V_L>3.2$ V, CM_Comp is disabled and, therefore, $SW_1$ remains high and $C_L$ is not charged. It can be seen that $f_{sw}$ is automatically adjusted to regulate $V_L$ at 3.2 V. The maximum $f_{sw}$ is limited to 166.6 kHz in VCIPM chip according to CRPD theory in the previous sections.

VI. MEASUREMENT RESULTS

Two sets of measurements have been made to prove the functionality of CRPD and VCIPM techniques. First, a proof-of-concept CRPD-based inductive link was designed using PSCs and its measured performance was compared with that of a conventional inductive link. In addition, an ASIC implementation of the VCIPM chip was done in a 0.35 µm standard CMOS process, and its operation in VM and CM was examined.

Table II below shows the geometries of Tx and Rx coils as well as circuit parameters that were used in CRPD measurement. The inductive link was designed at $f_p$ of 1 MHz to power a nominal $R_L$ of 100 kΩ at the nominal distance of $d_{12}=7$ cm. The diameter of the Rx coil was limited to $D_{o2}=3$ cm. The same set of Tx and Rx coils were used for both CRPD-based and conventional links.

Figure 11:
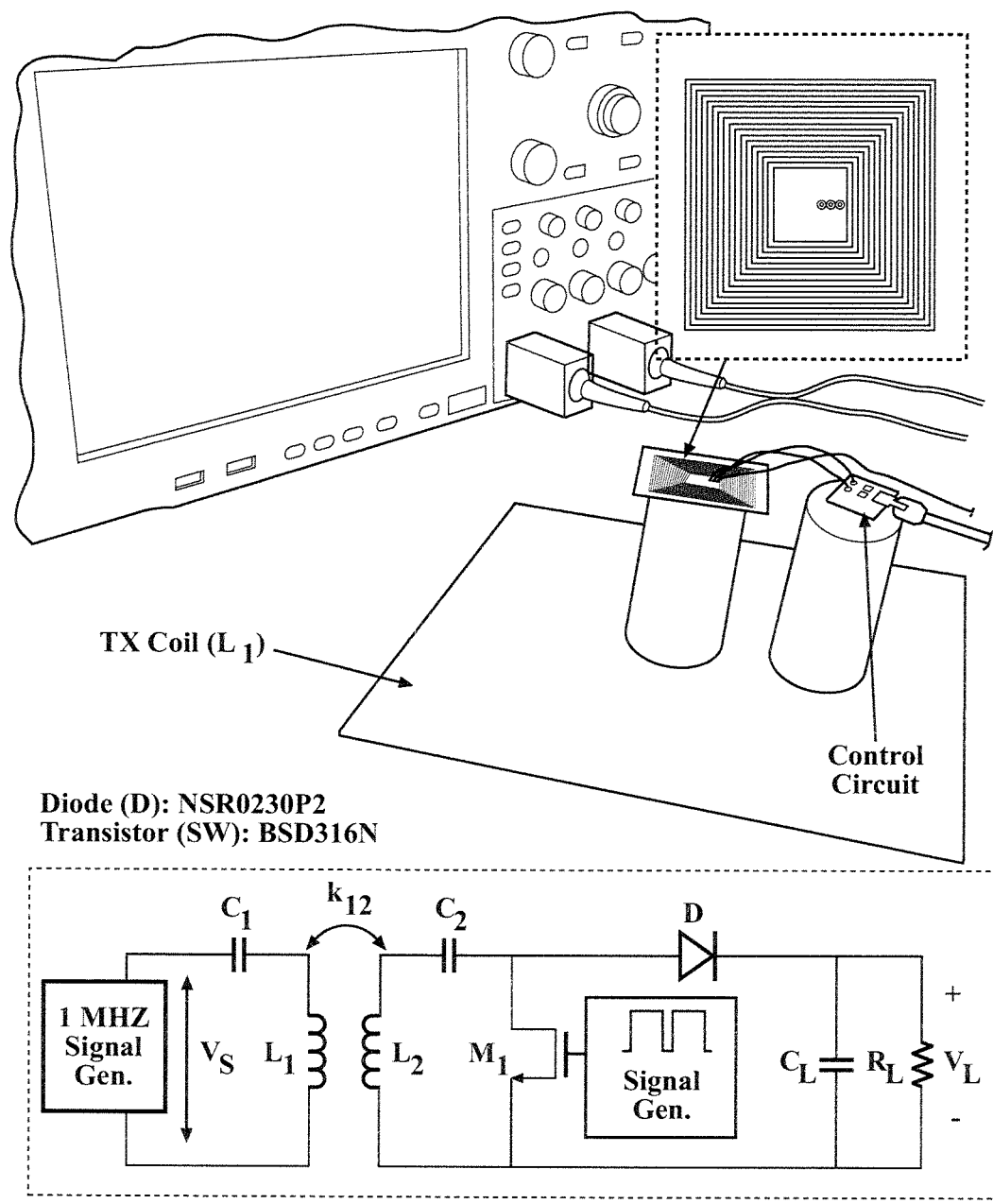
FIG. 11 is a CRPD measurement setup that includes two PCB coils, a discrete control circuit for $L_2C_2$-tank switching and power delivery to $C_L \| R_L$.

FIG. 11 shows the CRPD measurement setup that includes Tx and Rx coils, designed on FR4 printed circuit boards (PCBs), and a custom-designed discrete circuit for switching the $L_2C_2$-tank based on the optimal switching scheme in FIG. 4. The coil geometries and circuit parameters can be found in Table II. The setup block diagram has also been shown in FIG. 11 inset. In this proof-of-concept setup, a discrete transistor and diode with nominal $R_{M1}$ of 0.2Ω and $V_D$ of 0.3 V at the forward current of 10 mA were used, respectively. A function generator provided two synchronous signals to drive $L_1$ at $f_p$ of 1 MHz and the switch at adjustable $f_{sw}$. For the sake of comparison, the measurement setup was slightly modified to realize

TABLE II

COILS GEOMETRIES AND CIRCUIT PARAMETERS IN MEASUREMENTS FOR CRPD-BASED AND CONVENTIONAL INDUCTIVE LINKS

| | Parameters | Symbols | CRPD | Conventional |
|---|---|---|---|---|
| $L_1$ | Inductance (µH) | $L_1$ | 250 | |
| | Outer diameter (mm) | $D_{o1}$ | 170 | |
| | Fill factor | $\phi_1$ | 0.4 | |
| | Number of turns | $n_1$ | 35 | |
| | Line width (mm) | $w_1$ | 1.2 | |
| | Line spacing (mm) | $s_1$ | 0.2 | |
| | Quality factor | $Q_1$ | 62.5 | |
| $L_2$ | Inductance (µH) | $L_1$ | 4.4 | |
| | Outer diameter (mm) | $D_{o2}$ | 30 | |
| | Fill factor | $\phi_2$ | 0.55 | |
| | Number of turns | $n_2$ | 14 | |
| | Line width (mm) | | 0.6 | |
| | Line spacing (mm) | $s_2$ | 0.2 | |
| | Quality factor | $Q_2$ | *24.2 | 29 |
| | $L_1$-$L_2$ coupling distance (mm) | $d_{12}$ | 70 | |
| | Operation frequency (MHz) | $f_p$ | 1 | |
| | Nominal load resistance (kΩ) | $R_L$ | 100 | |
| | Load capacitance (nF) | $C_L$ | 100 | |
| | Source voltage (V) | $|V_s|$ | 0.39 | |

TABLE II-continued

COILS GEOMETRIES AND CIRCUIT PARAMETERS IN MEASUREMENTS FOR CRPD-BASED AND CONVENTIONAL INDUCTIVE LINKS

| Parameters | Symbols | CRPD | Conventional |
|---|---|---|---|
| Received voltage (V) | $|V_R|$ | 1 | 1.05 |
| Load voltage (V) | $V_L$ | 3.1 | 0.95 |
| Switching frequency (kHz) | $f_{sw}$ | 50 | — |
| Voltage conversion efficiency | VCE | 3.1 | 0.9 |
| PTE (%) | η | 5.3 | 0.45 |

*$Q_2$ in CRPD link also includes $R_{M1}$ of 0.2 Ω.

conventional inductive link, followed by a passive rectifier with similar diode and $C_L\|R_L$ as shown in FIG. 1.

Figure 12A:
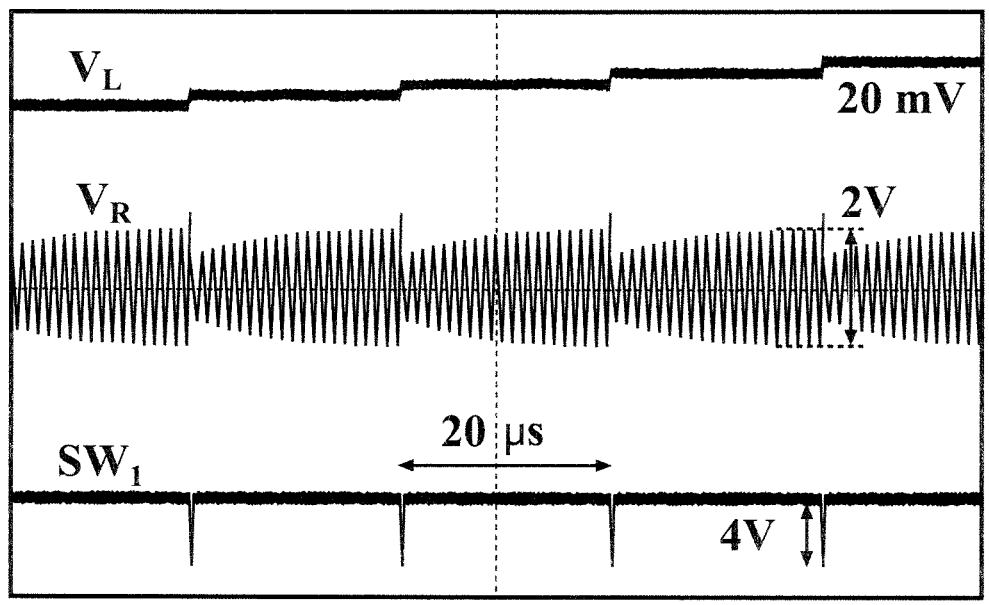
FIG. 12A shows measured key waveforms of the proposed CRPD in FIG. 3, operating at $f_p$=1 MHz and $f_{sw}$=50 kHz to deliver power to the $R_L$ of 100 kΩ.
Figure 12B:
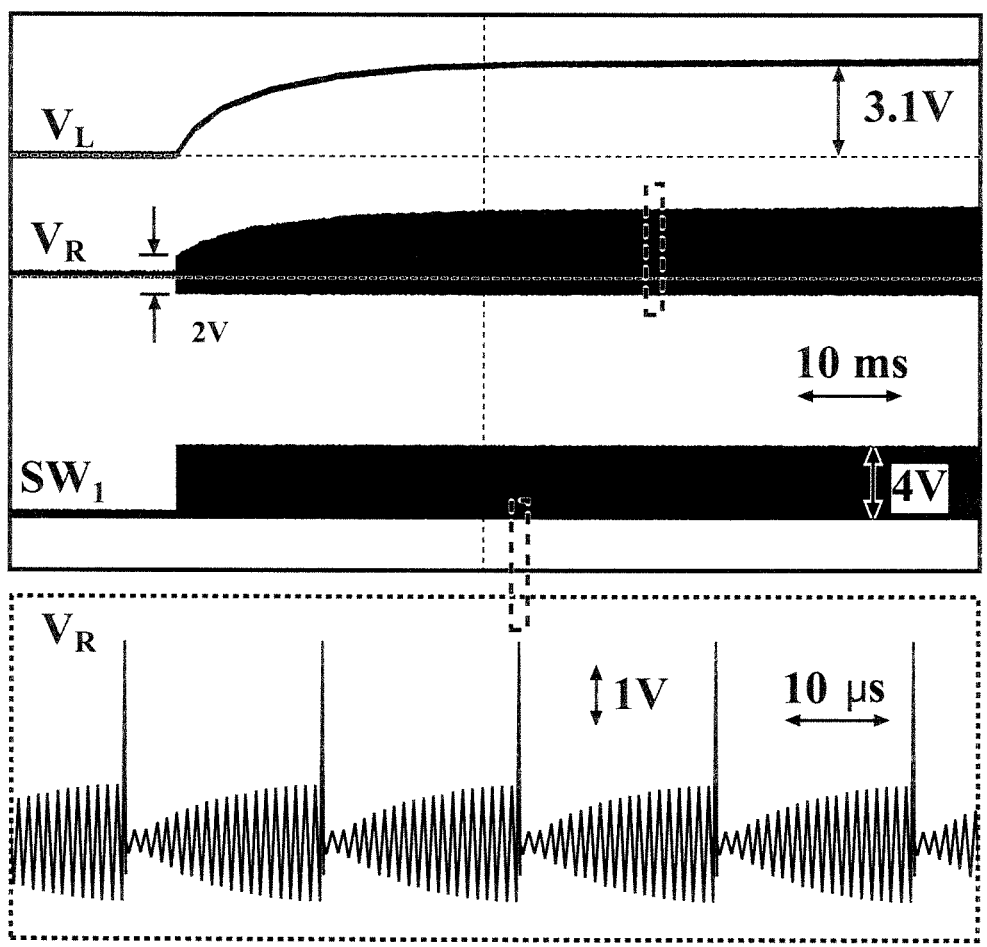
FIG. 12B shows measured key waveforms of the proposed CRPD in FIG. 3, operating at $f_p$=1 MHz and $f_{sw}$=50 kHz to deliver power to the $R_L$ of 100 kΩ. From top: $V_L$, $V_R$, and $SW_1$ waveforms, wherein $V_L$ increased to ~3.1 V after ~30 ms of switching, where $|V_R|$ was only 1 V, leading to a VCE of 3.1.

FIG. 12 shows the measured waveforms for the CRPD, including from top: $V_L$, $V_R$, and $SW_1$, when the inductive link was operating at $f_p=1$ MHz and $d_{12}=7$ cm with $f_{sw}=50$ kHz. As can be seen in FIG. 12A, $V_L$ across $R_L$ and $C_L$ of 100 kΩ and 100 nF increased for ~20 mV at each switching cycle of 20 µs, respectively. As shown in FIG. 12b, $V_L$ reached to 3.1 V within ~30 ms after the switching started, when the maximum amplitude of the received voltage, $|V_R|$, was only 1 V, leading to high VCE of 3.1 due to the CRPD. As shown in FIG. 12B inset, when the $SW_1$ was opened every 20 µs, $V_R$ suddenly jumped to ~3.4 V, which was higher than $V_L$ of 3.1 V, to provide a path for $L_2$ to be discharged into the load. It should be noted that the amplitude of $V_R$ was very small when $SW_1=0$, i.e., switch was opened for a long time, because the series connected $L_2C_2$-tank was heavily loaded by $R_L$ of 100 kΩ. In all measurements, the $SW_1$ was increased to 4 V to reduce the discrete switch resistance ($R_{M1}$). However, in another embodiment of the integrated CRPD, a low-voltage large transistor with small $R_{M1}$ may be used.

Figure 13:
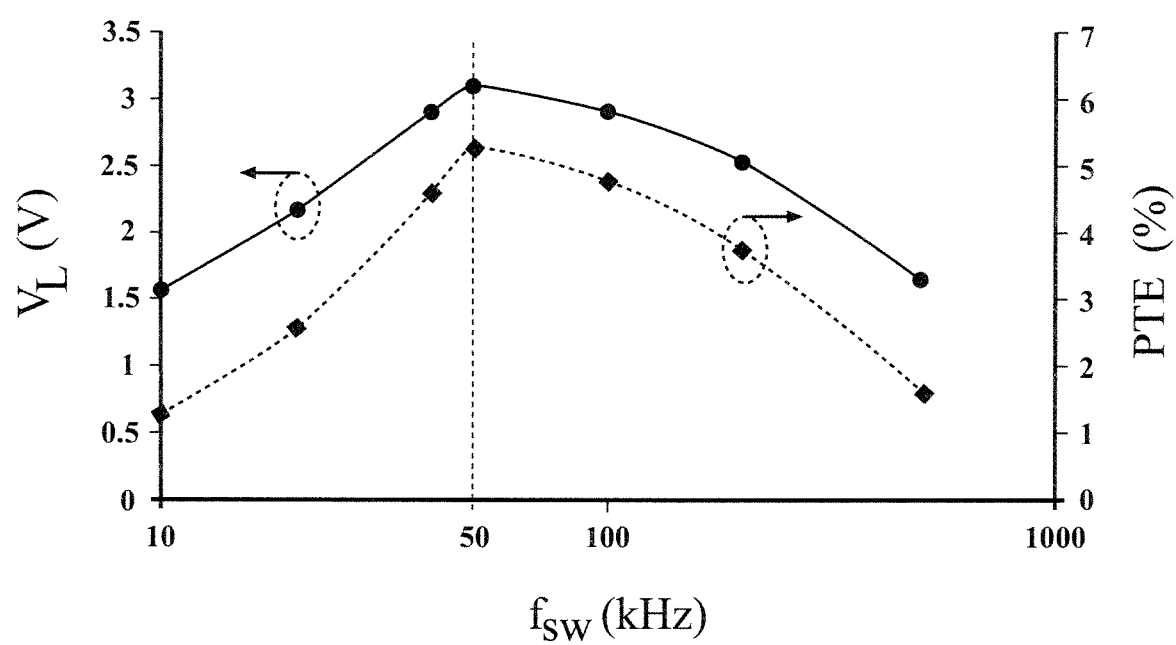
FIG. 13 is a graphical representation of measured $V_L$ and PTE of the CRPD-based inductive link vs. $f_{sw}$ for $R_L$ of 100 kΩ at $d_{12}$=7 cm and $|V_s|$=0.39 V.

FIG. 13 shows $V_L$ and PTE of the CRPD-based inductive link vs. $f_{sw}$ for the $R_L$ of 100 kΩ and $|V_s|$ of 0.39 V at $d_{12}=7$ cm. It can be seen that at the optimal $f_{sw}$ 50 kHz, maximum $V_L$ and PTE of 3.1 V and 5.3% may be achieved, respectively. For $f_{sw}$ much greater than 50 kHz, the $L_2C_2$-tank cannot store maximum energy and, therefore, $i_{L2}$ and $V_R$ in FIG. 3 may be small, resulting in low $V_L$ values. For $f_{sw}$ much smaller than 50 kHz, the $L_2C_2$-tank is shorted for a long period, and more energy may be wasted into the $L_2C_2$-tank ($R_2+R_{M1}$), resulting in low $V_L$ again. It should be noted that $|V_s|$ was measured at the input of the inductive link, as shown in FIG. 11 inset, to eliminate the effects of signal generator output impedance in the measurements. For the same conditions, the conventional inductive link may achieve $V_L$ and PTE of 0.95 V and 0.45%, respectively. Therefore, the proposed CRPD-based inductive link may increase $V_L$ and PTE by ~3.3 and 11.8 times, compared to the conventional inductive link, respectively.

Figure 14A:
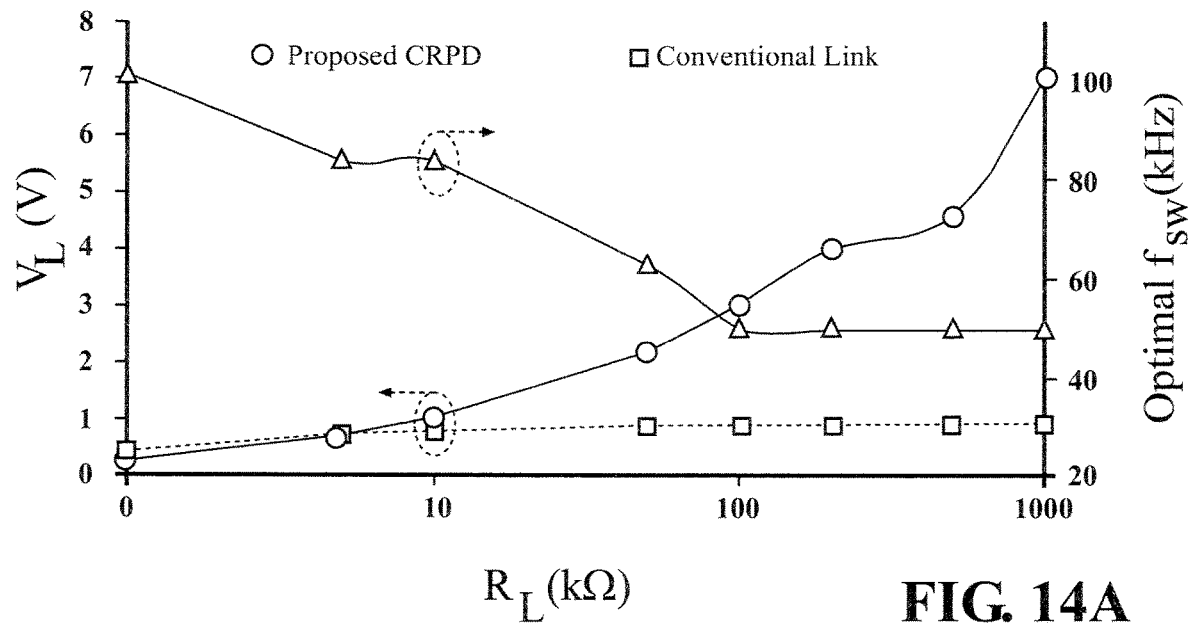
FIG. 14A is a graphical representation of measured $V_L$ of the CRPD-based and conventional inductive links vs. $R_L$ at $d_{12}$=7 cm and $|V_s|$=0.39 V.
Figure 14B:
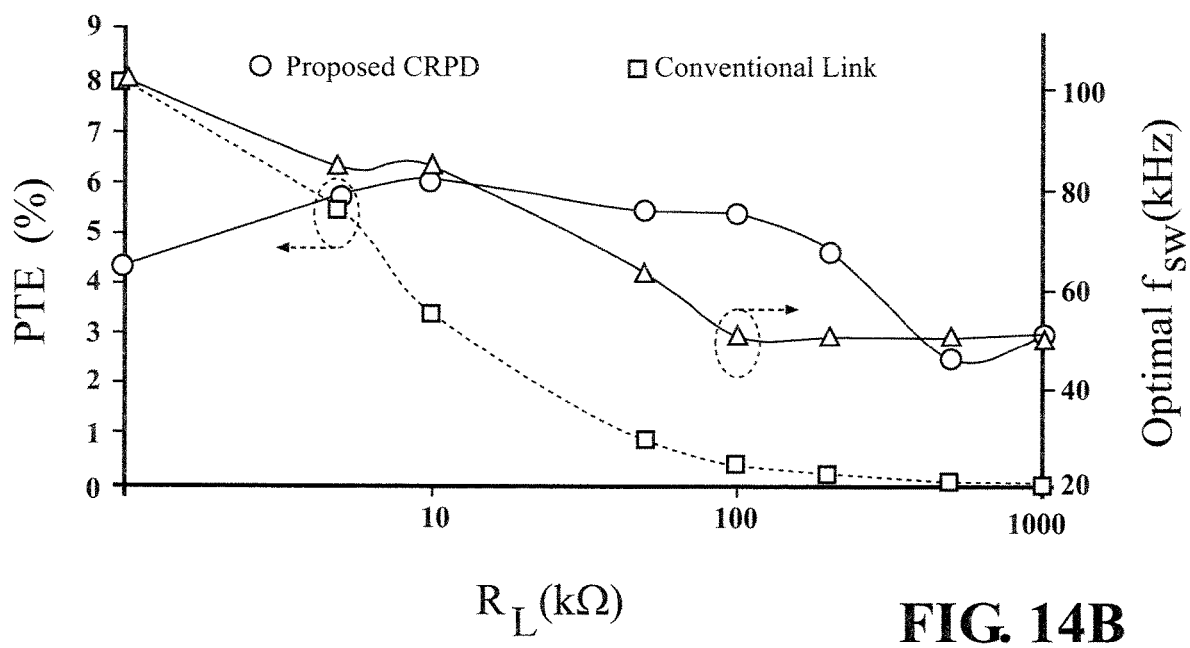
FIG. 14B is a graphical representation of measured PTE of the CRPD-based and conventional inductive links vs. $R_L$ at $d_{12}$=7 cm and $|V_s|$=0.39 V.

FIGS. 14A and 14B show $V_L$ and PTE vs. $R_L$ for both CRPD-based and conventional inductive links at $d_{12}=7$ cm and $|V_s|=0.39$ V, as well as the optimal $f_{sw}$ to maximize $V_L$ and PTE at each $R_L$, respectively. For the CRPD link, the optimal $f_{sw}$ at each $R_L$ was found in the measurements, and then $V_L$ and PTE were measured at each $R_L$ with the corresponding $f_{sw}$. It can be seen that the proposed CRPD may significantly improve $V_L$ and PTE for $R_L$ values larger than 5 kΩ. It can be seen in FIGS. 14a and 14b that for small $R_L$, which may demand more current from $C_L$, the optimal $f_{sw}$ may be increased to charge $C_L$ more frequently. However, for large $R_L$ the optimal $f_{sw}$ may be decreased to provide more time for the $L_2C_2$-tank to reach to its maximum energy. It can be seen in FIGS. 14a and 14b that the same $f_{sw}$ can maximize both $V_L$ and PTE. The CRPD-based link achieved higher $V_L$ and consequently PTE for $R_L \geq 10$ k$\Omega$ with the optimal $f_{sw}$s of 50-100 kHz. However, the conventional link was superior for $R_L<5$ k$\Omega$, at which the equivalent resistance of the parallel-connected $L_2C_2$-tank was matched to $R_L$. In CRPD, $A\Delta V_{L,dec}$ in equation (8) may be significantly increased for small values of $R_L$, and limited $V_L$. Nonetheless, the proposed CRPD-based link may achieve higher $V_L$ and PTE for a wide range of $R_L$.

In measurements, in order to synchronize $SW_1$ with the peak of $i_{L2}$ as shown in FIG. 4, the zero-crossing times of $V_R$ were observed, because when the $SW_1$ is closed and $V_R=0$, the maximum energy is stored in $L_2$, which is equivalent to $i_{L2}$ peaks. It should also be noted that for the same conditions, the conventional inductive link followed by the same passive rectifier achieved $|V_R|$ and $V_L$ of 1.05 and 0.95 V, leading to the small VCE of 0.9. In the conventional inductive link, $|V_R|$ was slightly higher than that of CRPD, because $L_2$ was not loaded by $R_{M1}$ of 0.2$\Omega$ and, therefore, $Q_2$ was higher.

It should be noted that based on FIGS. 14A and 14B, the proposed CRPD may be suitable for applications that either involve low-power consumption in the Rx side, i.e., large $R_L$, such as RFID and low-power IMDs, or require a duty-cycled high-power and high-voltage Rx, in which a large capacitor ($C_L$) is often charged through the inductive link and then discharged on a small $R_L$. As an example, FIG. 14a shows that $V_L$ of 7.1 V may be achieved for the large $R_L$ of 1 M$\Omega$, while $|V_R|$ was as small as 1 V, leading to the VCE of 7.1.

Figure 15:
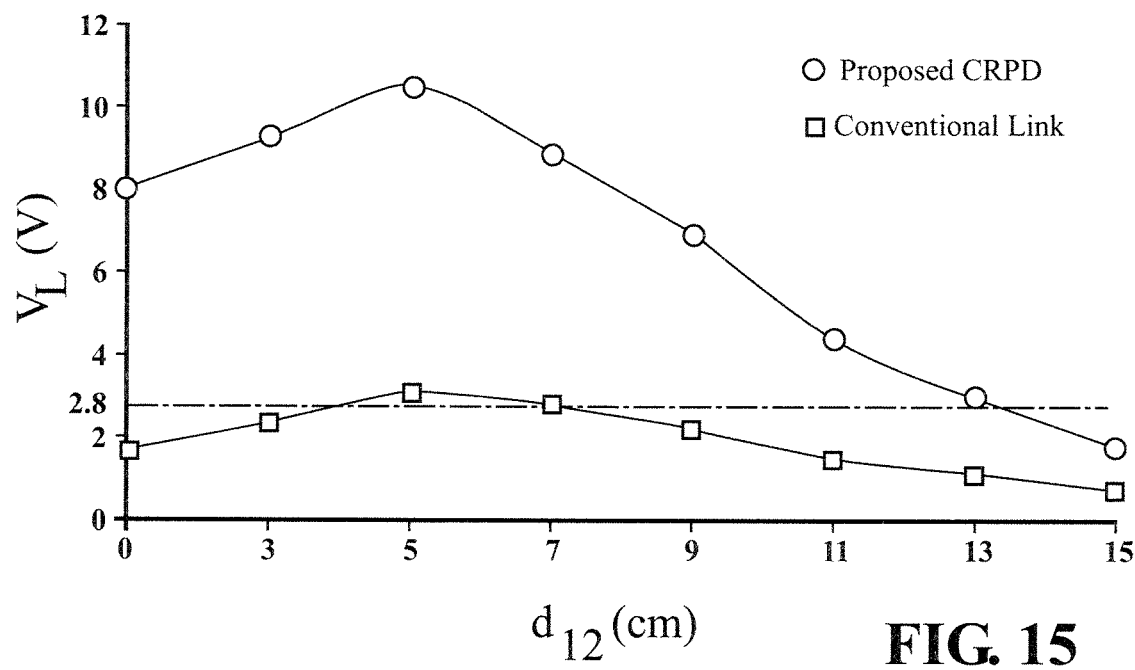
FIG. 15 is a graphical representation of measured values for $V_L$ for the CRPD-based and conventional inductive links vs. $d_{12}$ for $R_L$ of 100 kΩ and $|V_s|$=1.05 V.

FIG. 15 shows the measured values of $V_L$ vs. $d_{12}$ for the CRPD-based and conventional inductive links for $R_L$ of 100 k$\Omega$. FIG. 15 also shows the optimal values of $f_{sw}$ for the CRPD link at each distance. As the distance is increased from 1 cm to 15 cm, the optimal $f_{sw}$ reduces from 100 kHz to 50 kHz. In these measurements, $|V_s|$ was increased to 1.05 V to achieve a minimum $V_L$ of 2.8 V at $d_{12}=7$ cm in the conventional inductive link, which may be further regulated to 2.5 V. As shown in FIG. 15, the proposed CRPD could extend the powering distance to 13 cm to achieve the minimum $V_L$ of 2.8 V for the same $|V_s|$ of 1.05 V. It should be noted that $V_L$ was reduced for $d_{12}<5$ cm in both links, because the reflected load in equation (16) was increased at short distances, which reduced the available $P_s$. Therefore, $|V_s|$ can be safely increased at short distances to increase $V_L$ to 2.8 V in the conventional inductive link with a much smaller $P_s$ compared to $d_{12}>5$ cm, since PTE is much higher at short distances.

TABLE III

BENCHMARKING OF RECENT EXTENDED-RANGE INDUCTIVE POWER TRANSMISSION LINKS

| Parameters | 2015, [33] | 2017, [39] | 2016, [34] | CRPD |
|---|---|---|---|---|
| Tx/Rx Resonance | Series/Series | Series/Series | Series/Series | Series/Series |
| $V_R$ (V) | *5.5 | *25 | 4.8 | 1 |
| $V_L$ (V) | 4.5 | 20 | 4.22 | 3.1 |
| $R_L$ (k$\Omega$) | 0.2 | 0.02 | 0.5 | 100 |
| $f_p$ (MHz) | 2 | 0.2 | 13.56 | 1 |
| $f_{sw}$ (MHz) | 4 | — | 2.28 | 0.05 |
| VCE | 0.82 | 0.8 | 0.88 | 3.1 |

*Calculated from FIGURES in the paper.

Figure 16:
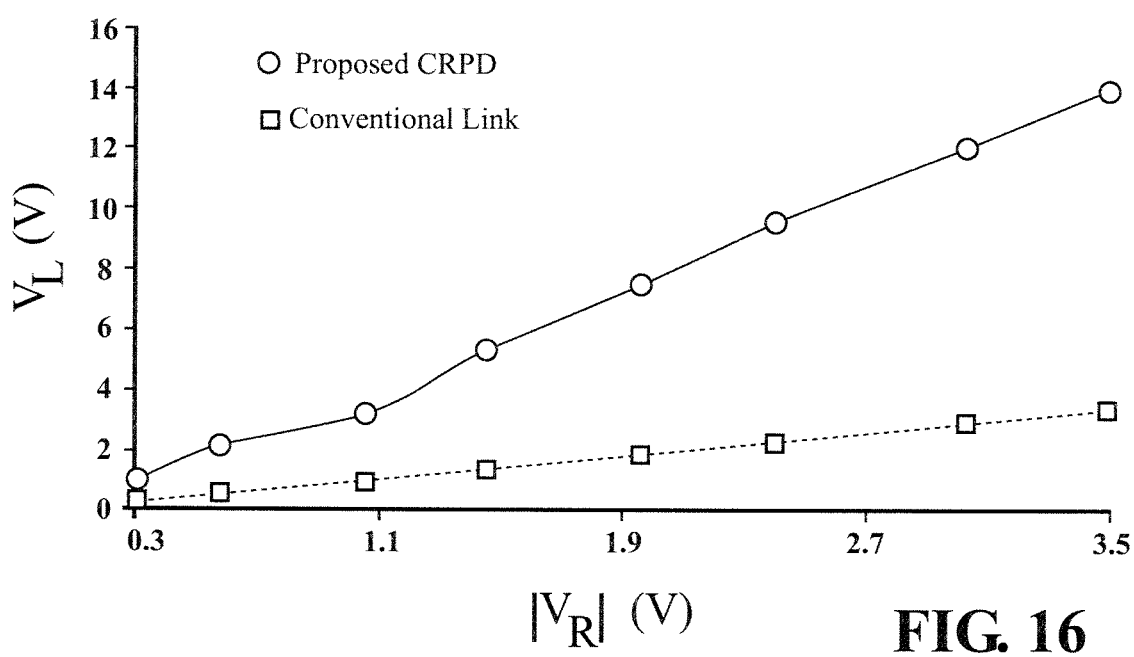
FIG. 16 is a graphical representation of measured $V_L$ of the CRPD-based and conventional inductive links vs. the amplitude of the received voltage, $|V_R|$, for $R_L$ of 100 kΩ, $d_{12}$ of 7 cm, and $f_{sw}$ of 50 kHz.

FIG. 16 shows the measured $V_L$ of the CRPD-based and conventional inductive links vs. $|V_R|$ for the $R_L$ of 100 k$\Omega$, $d_{12}$ of 7 cm, and $f_{sw}$ of 50 kHz. In these measurements, $|V_s|$ was swept to achieve these $|V_R|$ and $V_L$ values. For a wide range of $|V_R|$ from 0.3-3.5 V, the proposed CRPD may achieve a higher $V_L$ and consequently VCE. As can be seen in FIG. 16, the CRPD may increase $V_L$ to ~14 V for $|V_R|$ of 3.5 V, i.e., VCE=4, which shows that the proposed CRPD may be suitable for applications that require high voltage in the Rx side. Thus, the CRPD significantly increased $V_L$ for different $|V_R|$ values as compared with the conventional link. Some embodiments of the present invention may increase $V_L$ beyond 14 V and/or the powering distance may be increased over 13 cm. In accordance to some embodiments, the $L_2C_2$-tank may be operable to deliver energy to the loads having different $R_L$.

Table III benchmarks the proposed CRPD against recent extended-range inductive power transmission links for direct powering of a load. The proposed CRPD may offer a higher VCE for a large $R_L$ with adding a single switch, which can be easily integrated on a chip. Compared to the prior art, higher VCE has been achieved in the CRPD by creating a jump on the Rx coil voltage.

Figure 17:
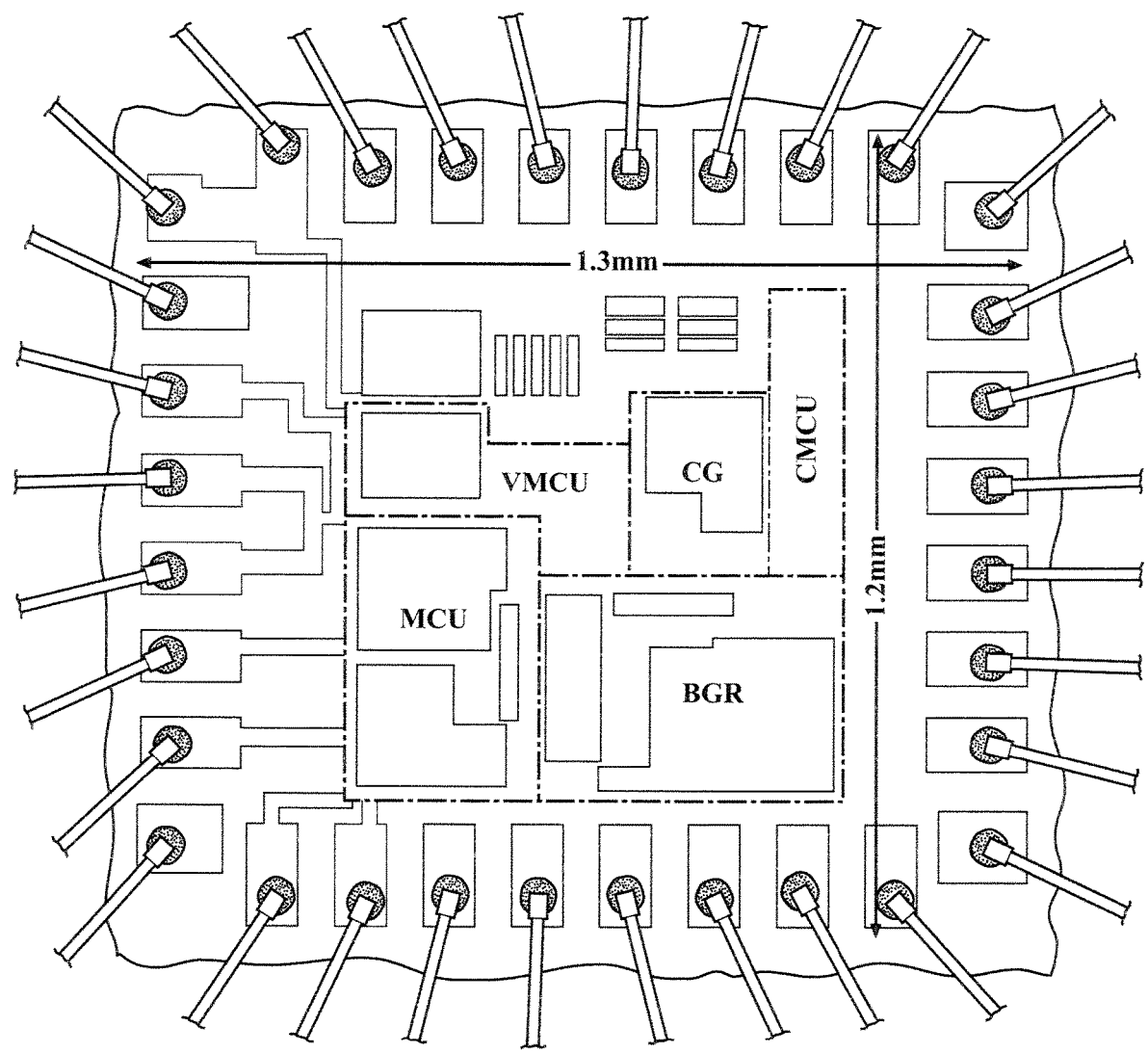
FIG. 17 is a VCIPM chip micrograph, occupying 1.56 mm² and 0.52 mm² with and without pads, respectively.

The following discussion presents the VCIPM chip measurement results. The VCIPM chip was fabricated in a 0.35 µm 2P4M standard CMOS process, occupying 1.56 mm$^2$ and 0.52 mm$^2$ with and without pads as shown in FIG. 17, respectively. Inductive coil geometry is the same as CRPD measurement set up, as shown in FIG. 11. In Tx, a signal generator was used to drive $L_1$ at $f_p=1$ MHz. In Rx, the $L_2C_2$-tank was connected to the VCIPM chip to achieve a regulated $V_L$ of 3.2 V across $C_L=2$ µF for different conditions.

Figure 18A:
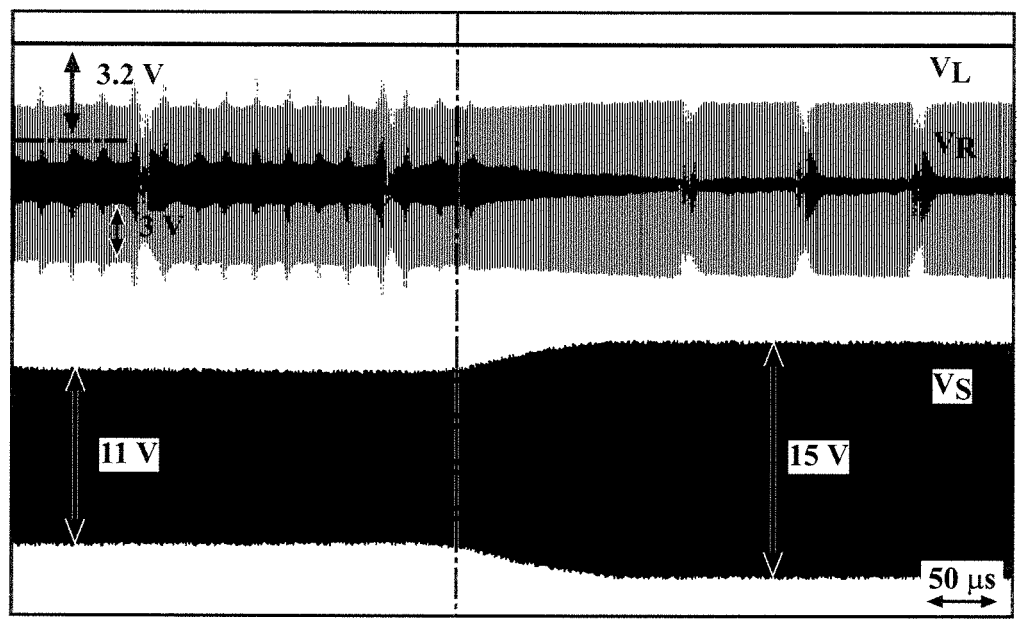
FIG. 18A is a graphical representation of measured $V_L$ and $V_R$ waveforms in voltage mode (VM) when the Tx voltage ($V_s$ in FIG. 9) was increased from 11 $V_{p-p}$ to 15 $V_{p-p}$ at $R_L$=100 kΩ.
Figure 18B:
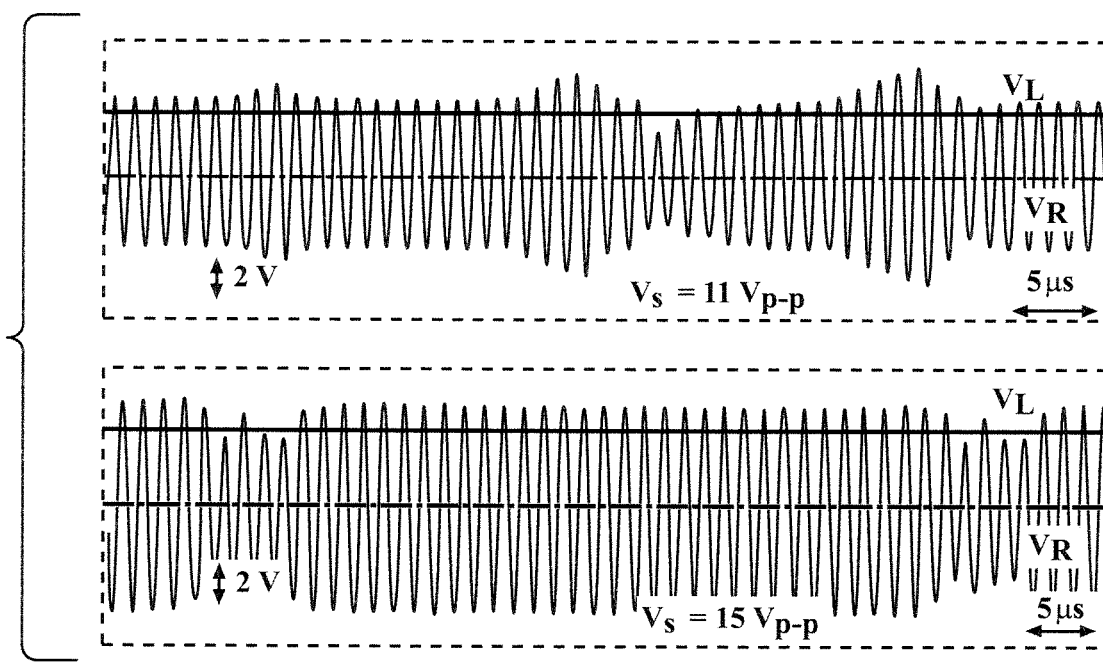
FIG. 18B is a graphical representation of Zoomed waveforms for $V_L$ and $V_R$, demonstrating how back current regulated $V_L$ at 3.2 V despite $V_s$ variations.

FIGS. 18A and 18B show the measured $V_L$ and $V_R$ waveforms with different time scales in VM at $R_L=100$ k$\Omega$ when the Tx voltage ($V_s$ in FIG. 11) was increased from 11 V to 15 V peak-to-peak, demonstrating that despite $V_s$ increase, the VCIPM chip adaptively adjusted the width of $SW_2$ pulses to regulate $V_L$ at 3.2 V. As shown in FIG. 18a, since the Rx LC-tank received more power at $V_s=15$ $V_{p-p}$, VCIPM chip employed back current more frequently, seen as sudden decreases in $V_R$, to regulate $V_L$. Since $V_{R,peak}$ was higher than 3.2 V, the chip automatically operated in VM. It should also be noted that due to the proposed back-current regulation, $V_R$ amplitude was maintained fairly constant despite $V_s$ increase.

Figure 19A:
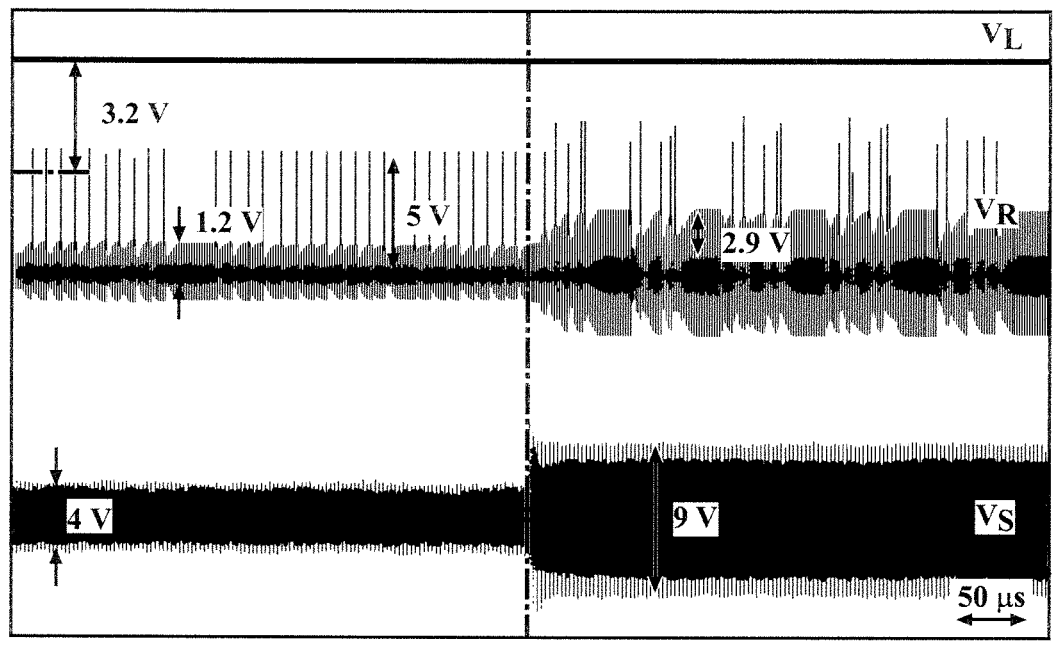
FIG. 19A is a graphical representation of measured $V_L$ and $V_R$ waveforms in current mode (CM) when $V_s$ was increased from 4 $V_{p-p}$ to 9 $V_{p-p}$ at $R_L$=100 kΩ.
Figure 19B:
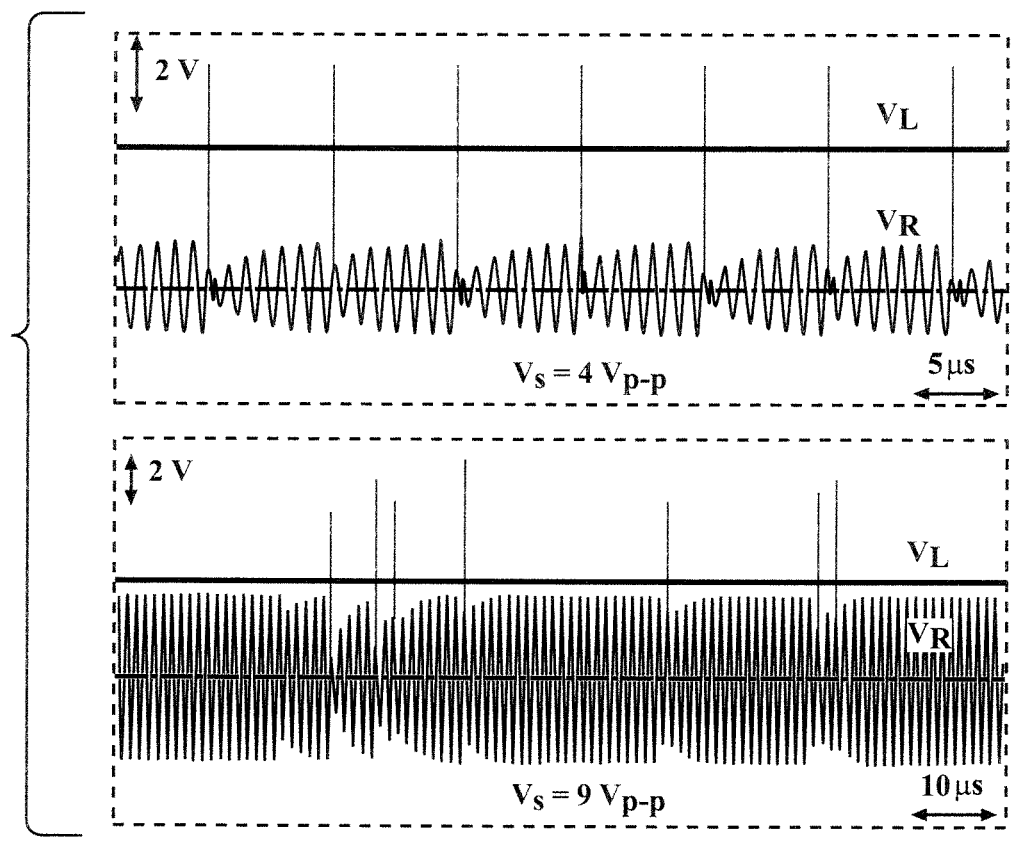
FIG. 19B is a graphical representation of zoomed waveforms for $V_L$ and $V_R$, demonstrating how changes in $f_{sw}$ regulated $V_L$ at 3.2 V despite $V_s$ variations.

FIGS. 19A and 19B show the measured $V_L$ and $V_R$ waveforms with different time scales in CM at $R_L=100$k$\Omega$ when $V_s$ was increased from 4 $V_{p-p}$ to 9 $V_{p-p}$, demonstrating that for $V_s=4$ $V_{p-p}$ (1) since $V_{R,peak}$ was 1.2 V in steady state without switching ($<V_{DD}=3.2$ V), the chip automatically operated in CM, and (2) $V_R$ jumped from 1.2 V to ~5 V by turning $M_1$ off with proper $SW_1$ pulses to charge $C_L$ to 3.2 V. Despite $V_s$ increase to 9 $V_{p-p}$, in which $V_{R,peak}$ increased to 2.9 V (still below 3.2 V), the VCIPM chip remained in CM configuration and adaptively adjusted $f_{sw}$ to regulate $V_L$ at 3.2 V. As shown in FIG. 19B, at lower $V_s$ of 4 $V_{p-p}$, resulting in less power delivered to Rx, the chip generated $SW_1$ pulses at the highest $f_{sw}$ of 166.6 kHz to more frequently charge $C_L$. In contrast, at higher $V_s$ of 9 $V_{p-p}$ with increased received power, $f_{sw}$ was automatically decreased to charge $C_L$ less frequently and regulate $V_L$ at 3.2 V. It should be noted that the proposed VCIPM chip achieved a high VCE of 2.7 V/V at $V_s=4$ $V_{p-p}$. Nonetheless, the maximum measured VCE in VCIPM chip was 3.55 V/V at $f_{sw}=166.6$ kHz, $R_L=100$ k$\Omega$, $V_L=3.2$ V, and steady state $V_{R,peak}$ of 0.9 V.

Figure 20:
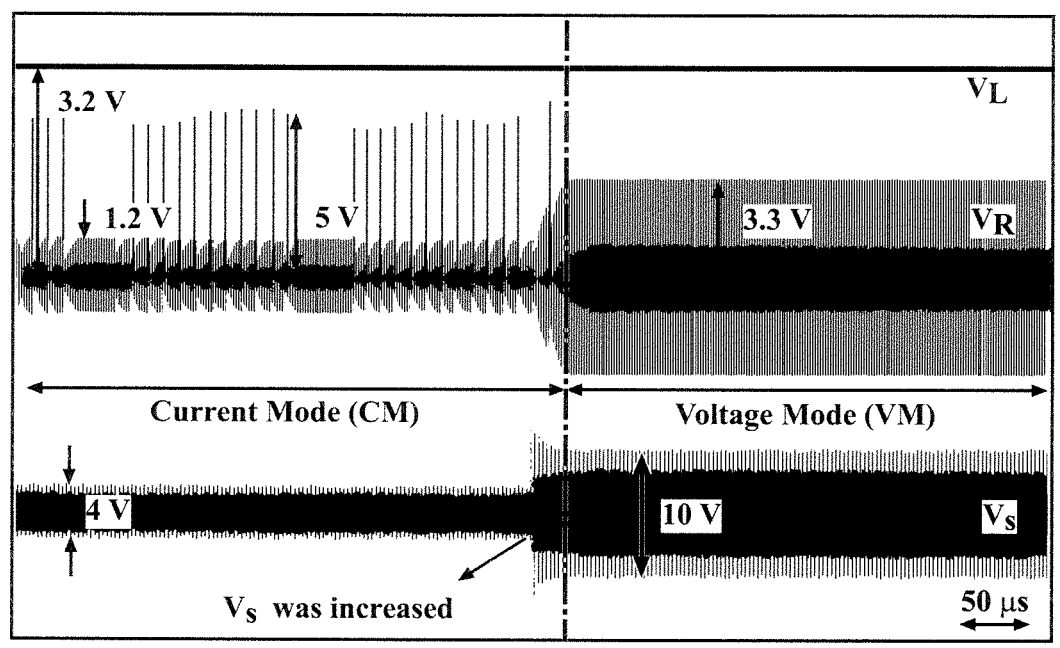
FIG. 20 is a graphical representation of measured $V_L$, $V_R$, and $V_s$ waveforms when $V_s$ was manually increased from 4 $V_{p-p}$ to 10 $V_{p-p}$, resulting in the automatic reconfiguration of the VCIPM chip from CM to VM based on the $V_R$ amplitude (1.2 V vs. 3.3 V) to regulate $V_L$ at 3.2 V.

FIG. 20 shows automatic reconfiguration of the VCIPM chip from CM to VM when $V_s$ was suddenly increased from 4 $V_{p-p}$ to 10 $V_{p-p}$ in measurements with $R_L=100$ k$\Omega$. At lower $V_s=4$ $V_{p-p}$, the steady-state $V_{R,peak}$ was 1.2 V and, therefore, the chip operated in CM to regulate $V_L$ at 3.2 V by large $V_{R,peak}$ of ~5 V, i.e., operating with high VCE of 2.7 V/V. As $V_s$ was increased to 10 $V_{p-p}$, $V_{R,peak}$ was gradually increased to 3.3 V after ~15 μs (higher than required $V_{DD}$ of 3.2 V), in which the VCIPM chip automatically changed its configuration to VM. FIG. 20 clearly shows that $V_L$ remained constant at 3.2 V for a drastic change in $V_R$ amplitude.

VII. CONCLUSION

A new power management has been presented for inductive power delivery that is able to work in both VM and CM adaptively. An ASIC implementation, and measurement results of a reconfigurable voltage- and current-mode power management with self-regulation for inductive power transmission is presented to operate in optimal configuration for different cases. The VCIPM chip could achieve high VCE and PCE by operating in current and voltage modes, respectively. In VCIPM chip, adjusting back current in VM and $f_{sw}$ in CM, regulation and OVP could be achieved along with rectification, eliminating the need for two off-chip capacitors.

In another measurement set up, CRPD technique is examined separately. The receiver LC-tank may be switched every several power carrier cycles to store energy in the LC-tank and then deliver it to the load within a quarter of the power carrier cycle by connecting the receiver LC-tank in series with a rectifier, which drives the load capacitor and resistor. Since the receiver LC-tank has been used as a current source, a large AC-DC voltage conversion efficiency may be achieved. Measurement results have shown that the proposed technique may increase the output of a conventional inductive link, followed by a passive rectifier. In a proof-of-concept measurement setup, the proposed technique could increase the rectifier output by 3.3 times from 0.95 V to 3.1 V across a load of 100 kΩ, by switching the receiver LC-tank at 50 kHz. These measurements have validated that the proposed current-based resonant power delivery technique may be suitable for extending the range of inductive power transmission for applications that involve receivers with low-power consumption and high voltage.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents. The entire content of the following articles are herein incorporated by reference in their entirety.

REFERENCES

[1] K. Finkenzeller, *RFID-Handbook*, 2nd ed. Hoboken, N.J.: Wiley, 2003.

[2] D. Zhou and E. Greenbaum, *Implantable neural prostheses* 1, New York, N.Y.: Springer, 2009.

[3] K. Chen, Z. Yang, L. Hoang, J. Weiland, M. Humayun, and W. Liu, "An integrated 256-channel epiretinal prosthesis," *IEEE J. Solid State Cir.*, vol. 45, pp. 1946-1956, September 2010.

[4] Y. Jang and M. M. Jovanovic, "A contactless electrical energy transmission system for portable-telephone battery chargers," *IEEE Trans. Indus. Elect.*, vol. 50, no. 3, pp. 520-527, June 2003.

[5] C. Wang, O. Stielau, and G. Covic, "Design considerations for a contactless electric vehicle battery charger," *IEEE Trans. Indus. Elect.*, vol. 52, pp. 1308-1314, October 2005.

[6] U. Jow and M. Ghovanloo, "Design and optimization of printed spiral coils for efficient transcutaneous inductive power transmission," *IEEE Trans. Biomed. Cir. Syst.*, vol. 1, pp. 193-202, September 2007.

[7] R. Muller, H. Le, W. Li, P. Ledochowitsch, S. Gambini, T. Bjorninen, A. Koralek, J. Carmena, M. Maharbiz, E. Alon, and J. Rabaey, "A minimally invasive 64-channel wireless μECoG implant", *IEEE J. Solid State Cir.*, vol. 50 pp. 344-359, January 2015.

[8] K. Montgomery, A. Yeh, J. Ho, V. Tsao, S. Iyer, L. Grosenick, E. Ferenczi, Y. Tanabe, K. Deisseroth, S. Delp, and A. Poon, "Wirelessly powered, fully internal optogenetics for brain, spinal and peripheral circuits in mice," *Nature Methods*, vol. 12, pp. 960-974, October 2015.

[9] G. Lazzi, "Thermal effects bioimplants," *IEEE Eng. Med. Biol. Mag.*, vol. 24, pp. 75-81, September 2005.

[10] *IEEE Standard for Safety Levels With Respect to Human Exposure to Radio Frequency Electromagnetic Fields, 3 kHz to 300 GHz*, IEEE Standard C95.1, 1999.

[11] M. W. Baker and R. Sarpeshkar, "Feedback analysis and design of RF power links for low-power bionic systems," *IEEE Trans. Biomed. Cir. Syst.*, vol. 1, no. 1, pp. 28-38, March 2007.

[12] A. Sample, D. Meyer, and J. Smith, "Analysis, experimental results, and range adaptation of magnetically coupled resonators for wireless power transfer," *IEEE Trans. Ind. Electron.*, vol. 58, pp. 544-554, February 2011.

[13] A. Kurs, A. Karalis, R. Moffatt, J. D. Joannopoulos, P. Fisher, and M. Soljacic, "Wireless power transfer via strongly coupled magnetic resonances," *Sci. Express*, vol. 317, pp. 83-86, July 2007.

[14] R. Xue, K. Cheng, and M. Je, "High-efficiency wireless power transfer for biomedical implants by optimal resonant load transformation," *IEEE Trans. Biomed. Cir. Syst.*, vol. 60, pp. 867-874, April 2013.

[15] K. Silay, D. Dondi, L. Larcher, M. Declercq, L. Benini, Y. Leblebici, and C. Dehollain, "Load optimization of an inductive power link for remote powering of biomedical implants," in *Proc. IEEE Int. Symp. Circuits Systems*, pp. 533-536, May 2005.

[16] M. Zargham and P. Gulak, "Maximum achievable efficiency in near-field coupled power-transfer systems," *IEEE Trans. Biomed. Cir. Syst.*, vol. 6, pp. 228-245, June 2012.

[17] T. Le, J. Han, A. Jouanne, K. Marayam, and T. Fiez, "Piezoelectric micropower generation interface circuits," *IEEE J. Solid State Cir.*, vol. 41, pp. 1411-1420, June 2006.

[18] H. Lee and M. Ghovanloo, "An integrated power-efficient active rectifier with offset-controlled high speed comparators for inductively powered applications," *IEEE Trans. Circuits Syst. I, Reg. Papers*, vol. 58, pp. 1749-1760, August 2011.

[19] S. Guo and H. Lee, "An efficiency-enhanced CMOS rectifier with unbalanced-biased comparators for transcutaneous-powered high-current implants," *IEEE J. Solid State Cir.*, vol. 44, no. 6, pp. 1796-1804, June 2009.

[20] M. Kiani, U. Jow, and M. Ghovanloo, "Design and optimization of a 3-coil inductive link for efficient wireless power transmission," *IEEE Trans. Biomed. Cir. Syst.*, vol. 5, pp. 579-591, December 2011.

[21] M. Kiani and M. Ghovanloo, "A figure-of-merit for designing high performance inductive power transmission links," *IEEE Trans. Indus. Elect.*, vol. 60, pp. 5292-5305, November 2013.

[22] B. Lee, P. Yeon, and M. Ghovanloo, "A multi-cycle Q-modulation for dynamic optimization of inductive links," *IEEE Trans. Ind. Electron.*, vol. 63, no. 8, pp. 5091-5100, 2016.

[23] L. Cheng, W. Ki, T. Wong, T. Yim, and C. Tsui, "A 6.78 MHz 6 W wireless power receiver with a 3-level 1×/½×/0× reconfigurable resonant regulating rectifier," *IEEE Int. Solid State Cir. Conf. (ISSCC) Dig. Tech. Papers*, pp. 376-377, February 2016.

[24] C. Kim, S. Ha, J. Park, A. Akinin, P. P. Mercier, and G. Cauwenberghs, "A 144 MHz integrated resonant regulating rectifier with hybrid pulse modulation," in *Proc. Symp. VLSI Circuits*, June 2015, pp. C284C285.

[25] Xing Li, Chi-Ying Tsui, and Wing-Hung K, "A 13.56 MHz wireless power transfer system with reconfigurable resonant regulating rectifier and wireless power control for implantable medical devices," *IEEE J. Solid State Cir.*, vol. 50, no. 4, pp. 978-989, April 2015.

[26] H. Lee and M. Ghovanloo, "An adaptive reconfigurable active voltage doubler/rectifier for extended-range inductive power transmission," *IEEE Int. Solid State Cir. Conf. (ISSCC) Dig. Tech. Papers*, pp. 286-288, February 2012.

[27] E. Lee, "A voltage doubling passive rectifier/regulator circuit for biomedical implants," *IEEE Custom Integrated Cir. Con. (CICC)*, pp. 1-4, September 2015.

[28] C. Kim, J. Park, A. Akinin, S. Ha, R. Kubendran, H. Wang, P. P. Mercier, and G. Cauwenberghs, "A fully integrated 144 MHz wireless-power-receiver-on-chip with an adaptive buck-boost regulating rectifier and low-loss H-Tree signal distribution," in *Proc. Symp. VLSI Circuits*, June 2015, pp. C284C285.

[29] C. Wu, X. Qian, M. Cheng, Y. Liang, and W. Chen, "A 13.56 MHz 40 mW CMOS high-efficiency inductive link power supply utilizing on-chip delay-compensated voltage doubler rectifier and multiple LDOs for implantable medical devices," *IEEE J. Solid State Cir.*, vol. 49, no. 11, pp. 2397-2407, November 2014.

[30] R. Muller, H. Le, W. Li, P. Ledochowitsch, S. Gambini, T. Bjorninen, A. Koralek, J. Carmena, M. Maharbiz, E. Alon, and J. Rabaey, "A minimally invasive 64-channel wireless μECoG implant," *IEEE J. Solid State Cir.*, vol. 50 pp. 344-359, January 2015.

[31] T. Y. Man, P. K. T. Mok, and M. J. Chan, "A 0.9-V input discontinuous conduction-mode boost converter with CMOS-control rectifier," *IEEE J Solid State Cir.*, vol. 43, no. 9, pp. 2036-2046, September 2008.

[32] G. Silveira, F. Tofoli, L. Bezerra, R. Torrico-Bascope, "A nonisolated DC-DC boost converter with high voltage gain and balanced output voltage," *IEEE Trans. Ind. Electron.*, vol. 61, no. 12, pp. 6739-6746, December 2014.

[33] M. Kiani, B. Lee, P. Yeon, and M. Ghovanloo, "A power-management ASIC with Q-modulation capability for efficient inductive power transmission," *IEEE Int. Solid State Cir. Conf. (ISSCC) Dig. Tech. Papers*, pp. 226-227, February 2015.

[34] M. Kiani, B. Lee, P. Yeon, and M. Ghovanloo, "A Q-modulation technique for efficient inductive power transmission," *IEEE J Solid State Cir.*, vol. 50, pp. 2839-2848, 2015.

[35] M. Choi, T. Jang, J. Jeong, S. Jeong, D. Blaauw, and D. Sylvester, "A current-mode wireless power receiver with optimal resonant cycle tracking for implantable systems," *IEEE Int. Solid State Cir. Conf. (ISSCC) Dig. Tech. Papers*, pp. 372-373, February 2016.

[36] H. Sadeghi Gougheri and M. Kiani, "An adaptive reconfigurable voltage/current-mode power management with self-regulation for extended-range inductive power transmission," *IEEE Int. Solid State Cir. Conf. (ISSCC) Dig. Tech. Papers*, February 2017.

[37] S. Tang, S. Hui, and H. Chung, "Coreless planar printed-circuit-board (PCB) transformers a fundamental concept for signal and energy transfer," *IEEE Trans. Power Elect.*, vol. 15, pp. 931-941, September 2000.

[38] H. Lee and M. Ghovanloo, "A power-efficient wireless capacitor charging system through an inductive link," *IEEE Trans. Cir. Syst. II*, vol. 60, pp. 707-711, October 2013.

[39] X. Qu, Y. Jing, H. Han, S. Wong, and C. Tse, "Higher order compensation for inductive-power-transfer converters with constant-voltage or constant current output combating transformer parameter constraints," *IEEE Trans. Power Electron.*, vol. 32, pp. 394-405, January 2016.

The invention claimed is:

1. A current-based resonant power delivery method for inductive power transmission to a load, comprising the following steps:
providing a current-based resonant power delivery device, comprising;
a transmitter coil;
a receiver circuit, the receiver circuit having a receiver coil, a resonance capacitor, a first switch, a rectification device, and a load capacitor; and
the transmitter coil configured to energize the receiver coil, the receiver coil connected to the load via the resonance capacitor and the rectification device, the first switch having a first state and a second state, the receiver circuit configured to build up and transfer energy between the receiver coil and the resonance capacitor by bypassing the load during the first state of the first switch, the receiver circuit further configured to transfer energy from the receiver coil to the load during the second state of the first switch, wherein the receiver coil and the resonance capacitor are connected in a series connection, the first switch is connected in parallel with the series connection, and the rectification device is connected between the resonance capacitor and the load;
energizing the transmitter coil;
selecting the first state of the first switch and thereby bypassing the load during the first state of the first switch for at least one full power carrier cycle for building up and transferring energy between the receiver coil and the resonance capacitor for a pre-determined time for obtaining a desired load voltage across the load, the desired load voltage being more than a receiver coil voltage; and
selecting the second state of the first switch for transferring the energy from the receiver coil to the load after the pre-determined time.

2. The current-based resonant power delivery method of claim 1, wherein the rectification device comprises a diode.

3. The current-based resonant power delivery method of claim 1, wherein during the step of selecting the first state, the first switch remains in the first state for a plurality of power carrier cycles until the receiver coil reaches a desired receiver coil current and then the first switch transitions from the first state to the second state, the first switch remains in the second state for one-quarter of a power cycle, and returns to the first state for the plurality of power carrier cycles.

4. The current-based resonant power delivery method of claim 1, wherein the first switch of the current-based resonant power delivery device has an adjustable switch frequency, the first switch transitioning from the first state to the second state and vice versa.

5. The current-based resonant power delivery method of claim 3, wherein the first switch is transitioning between the first state and the second state at a first switching frequency to maintain the load about a desired load voltage.

6. The current-based resonant power delivery method of claim 1, wherein the current-based resonant power delivery device further comprises:
   a second switch connected between the first switch and the resonance capacitor at one end and the load on other end;
   a mode selection circuit operable to select a voltage mode or a current mode based on a voltage across the receiver coil and the desired load voltage across the load, the mode selection circuit selecting the voltage mode when the desired load voltage is less than the receiver coil voltage and the mode selection circuit selecting the current mode when the desired load voltage is more than the receiver coil voltage;
   a third switch, the receiver coil connected to the load via the third switch, the third switch configured to maintain the load about the desired load voltage by employing back current during the voltage mode; and
   wherein the first switch is connected between the resonance capacitor and the ground, the receiver circuit further configured to transfer energy from the receiver coil to the load during the second state of the first switch when a desired energy is stored in the receiver coil during the current mode, and the first switch is configured to maintain the load about the desired load voltage by adjusting its switching frequency during the current mode; and
   selecting the voltage mode or the current mode by the mode selection circuit.

7. The current-based resonant power delivery method of claim 6, wherein the third switch is operable to transition between an ON state and an OFF state at a second switching frequency.

8. The current-based resonant power delivery method of claim 7, wherein the current-based resonant power delivery device further comprises a voltage mode controller, the voltage mode controller operable to regulating the second switching frequency to maintain the load about the desired load voltage during the voltage mode.

9. The current-based resonant power delivery method of claim 5, wherein the current-based resonant power delivery device further comprises a current mode controller, the current mode controller operable to regulating the first switching frequency to maintain the load about the desired load voltage.

* * * * *